(12) United States Patent
Souma

(10) Patent No.: US 7,630,139 B2
(45) Date of Patent: Dec. 8, 2009

(54) ZOOM LENS, IMAGE PICKUP APPARATUS AND DIGITAL EQUIPMENT

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/143,099

(22) Filed: Jun. 20, 2008

(65) Prior Publication Data
US 2009/0002842 A1 Jan. 1, 2009

(30) Foreign Application Priority Data
Jun. 27, 2007 (JP) ............... 2007-169356

(51) Int. Cl.
G02B 15/14 (2006.01)
G02B 27/64 (2006.01)
G02B 15/15 (2006.01)

(52) U.S. Cl. ............. 359/676; 359/678; 359/684; 359/557

(58) Field of Classification Search ........ 359/676, 359/678, 680–684, 726–729, 730–733, 737, 359/649, 554, 555, 557; G02B 15/177
See application file for complete search history.

(56) References Cited

U.S. PATENT DOCUMENTS 7,372,635 B2 * 5/2008 Morooka et al. ........... 359/678
7,532,408 B2 * 5/2009 Souma ................. 359/676
2008/0278824 A1 * 11/2008 Shirota ................ 359/684

FOREIGN PATENT DOCUMENTS

| JP | 5-107476 A | 4/1993 |
| JP | 5-323196 A | 12/2003 |
| JP | 2004-348082 A | 12/2004 |
| JP | 2006-71993 A | 3/2006 |

* cited by examiner

Primary Examiner—Scott J Sugarman
Assistant Examiner—Zachary Wilkes
(74) Attorney, Agent, or Firm—Sidley Austin LLP

(57) ABSTRACT

A zoom lens includes, in order from an object side thereof: a first lens group having a negative optical power and comprising a reflection optical element; a second lens group having a positive optical power; a third lens group having a negative optical power; a fourth lens group having a positive optical power; and, a fifth lens group. The first lens group and the fourth lens group are positioned at a fixed distance and at least the second lens group, the third lens group and the fifth lens group move along an optical axis, for varying a power of the zoom lens from a wide-angle end to a telephoto end. The zoom lens satisfies a predetermined expression relating to a focal length of the first lens group, and a focal length of the zoom lens at the wide-angle end.

14 Claims, 17 Drawing Sheets

EXAMPLE 3

EXAMPLE 4

EXAMPLE 5

FIG. 11 (A) EXAMPLE 1 (WIDE-ANGLE END, IN NORMAL CONDITION) y'=2.88
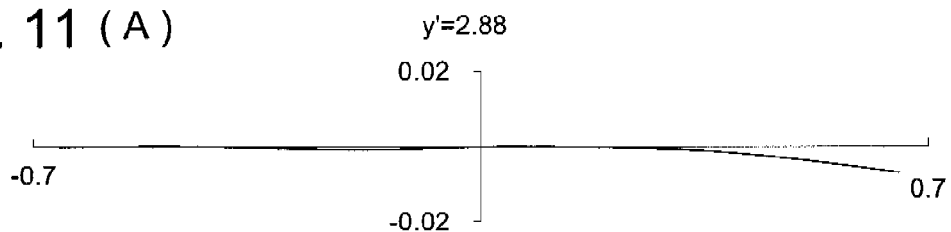
FIG. 11 (B) y'=0
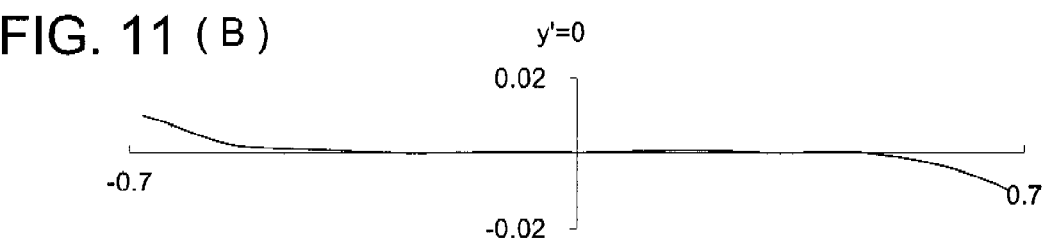
FIG. 11 (C) EXAMPLE 1 (WIDE-ANGLE END, IN CORRECTION BY 0.3°) y'=2.88
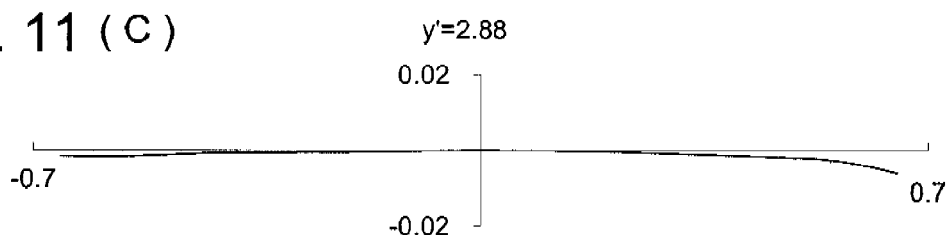
FIG. 11 (D) y'=0
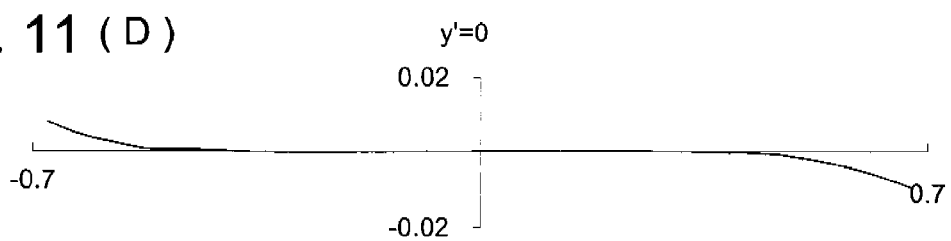
FIG. 11 (E) y'=-2.88
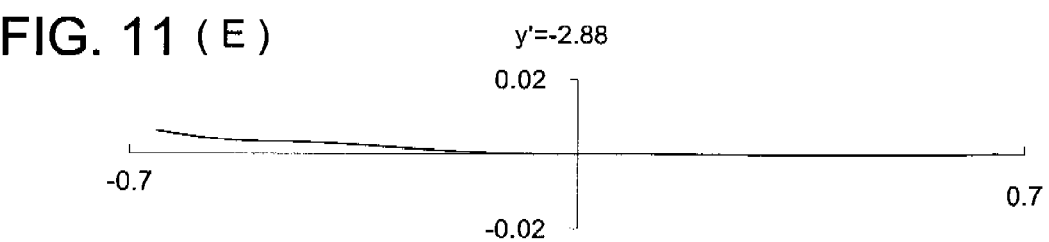

EXAMPLE 1 (TELEPHOTO END, IN NORMAL CONDITION)

EXAMPLE 1 (TELEPHOTO END, IN CORRECTION BY 0.3°)

EXAMPLE 4 (WIDE-ANGLE END, IN NORMAL CONDITION)

EXAMPLE 4 (WIDE-ANGLE END, IN CORRECTION BY 0.3°)

FIG. 14 (A) EXAMPLE 4 (TELEPHOTO END, IN NORMAL CONDITION)
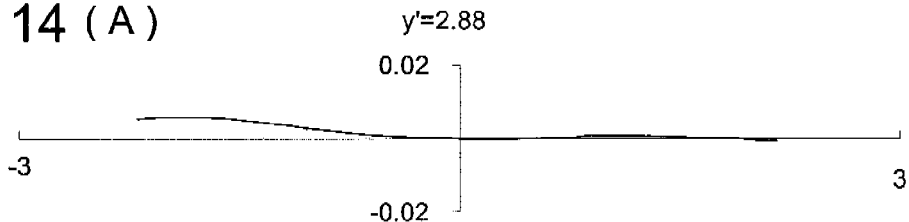
FIG. 14 (B)
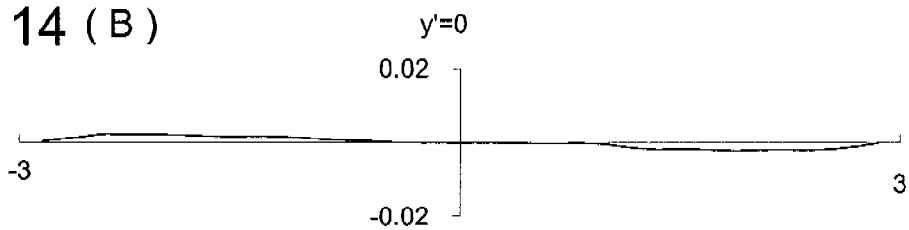
FIG. 14 (C) EXAMPLE 4 (TELEPHOTO END, IN CORRECTION BY 0.3°)
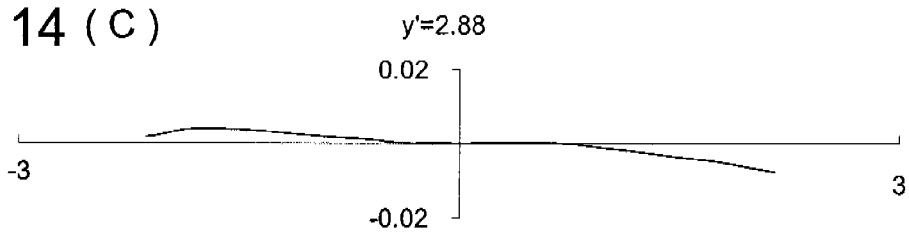
FIG. 14 (D)
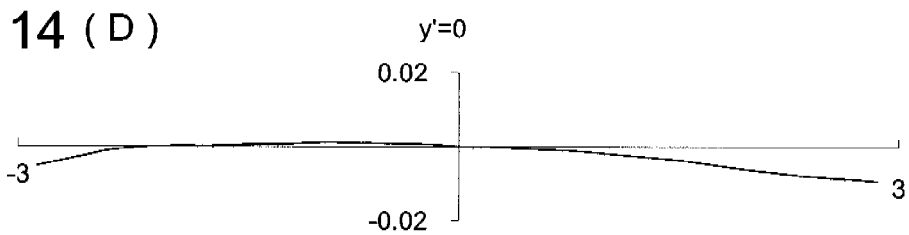
FIG. 14 (E)
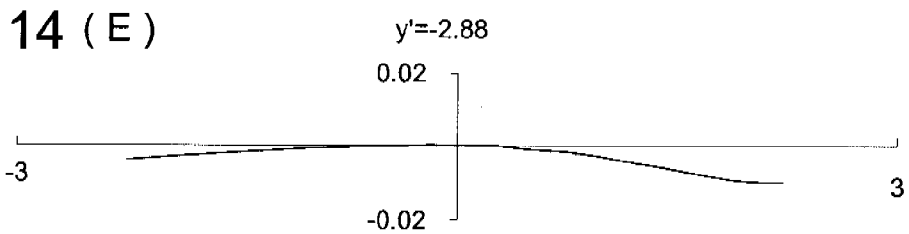

EXAMPLE 5 (WIDE-ANGLE END, IN NORMAL CONDITION)

EXAMPLE 5 (WIDE-ANGLE END, IN CORRECTION BY 0.3°)

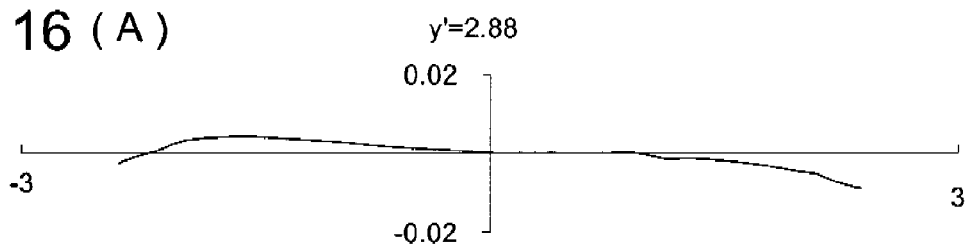
FIG. 16 (A) EXAMPLE 5 (TELEPHOTO END, IN NORMAL CONDITION)
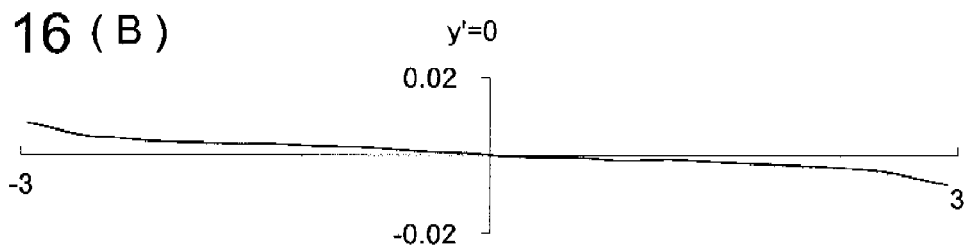
FIG. 16 (B)
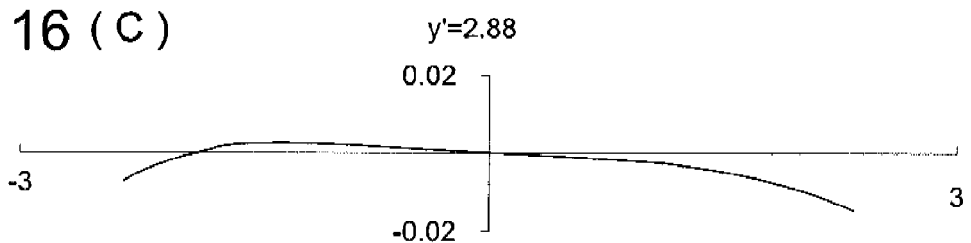
FIG. 16 (C) EXAMPLE 5 (TELEPHOTO END, IN CORRECTION BY 0.3°)
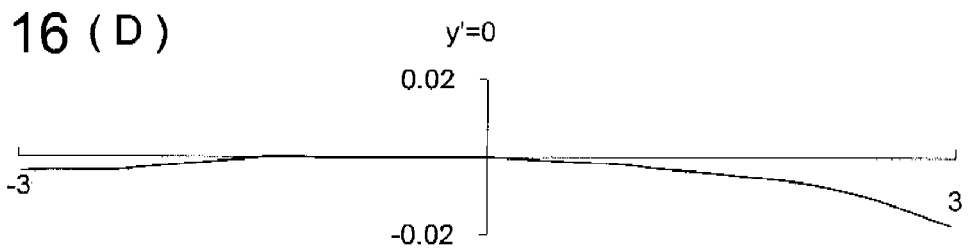
FIG. 16 (D)
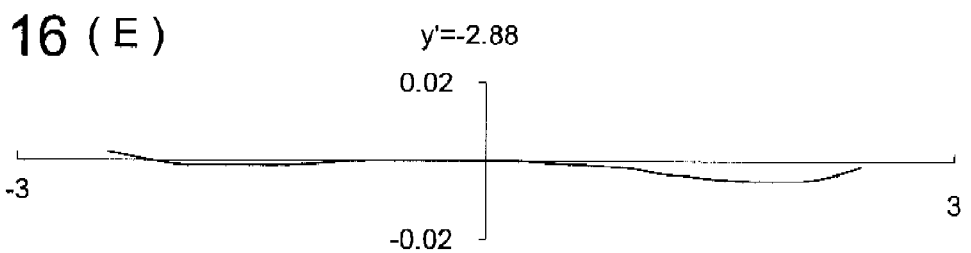
FIG. 16 (E)

ZOOM LENS, IMAGE PICKUP APPARATUS AND DIGITAL EQUIPMENT

This application is based on Japanese Patent Application No. 2007-169356 filed on Jun. 27, 2007, in Japanese Patent Office, the entire content of which is hereby incorporated by reference.

TECHNICAL FIELD

The present invention relates to a zoom lens, an image pickup apparatus and a digital equipment. Particularly, it relates to a zoom lens that is used for, for example, an optical unit for taking in an image of a subject with an image pickup element, has a variable power ratio of about seven times and has a zoom area exhibiting relatively wide angle of view, to an image pickup apparatus equipped with the zoom lens and to a digital equipment equipped with the image pickup apparatus.

BACKGROUND

In recent years, a digital camera has come into wide use rapidly, and it has exceeded a device to take in simply an image into a computer, to be used widely as a tool to take photographs in the same way as in conventional silver halide cameras. Under the aforesaid condition, demands for functions useful for taking photographs (for example, a higher variable power ratio and a wider angle of view) and for providing a thin and compact digital camera have become strong. Further, achievement of higher optical ability is requested, because the number of pixels of the image pickup element is in the trend to increase year after year. Even an equipment for taking in a moving image, such as a camcorder, is requested an optical ability that is higher than the conventional one, with a background of coping with still image picture-taking function and with high definition television such as Hi-Vision.

There is generally used a technique to bend an optical path in an optical unit as an effective technique for reducing thickness of an apparatus having a function of image pickup, such as a digital camera. For example, Unexamined Japanese Patent Application Publication (JP-A) No. 2006-71993 suggests a zoom lens including, in order from the object side, a first lens group having positive optical power including a prism that bends an optical path, a second lens group having negative optical power, a third lens group having positive optical power, a fourth lens group having positive optical power and a fifth lens group. The zoom lens achieves variable power ratio of about ×5 by constituting the so-called positive-lead zoom type. Further, JP-A No. 2004-348082 suggests a zoom lens achieving a wider angle of view by including, in order from the object side, a first lens group having negative optical power including a prism that bends an optical path, a second lens group having negative optical power, and a third lens group having positive optical power.

As a zoom lens of a straight type in which the optical path is not bent, there has been suggested a zoom structure having a variable-power ratio that is higher than that of the zoom structure of folded optics type in which the optical path is bent. For example, JP-A Nos. 5-107476 and No. 5-323196 disclose a zoom lens attaining the variable-power ratio that is as high as about ×7-×17 by providing a first lens group having negative optical power, a second lens group having positive optical power, a third lens group having negative optical power, a fourth lens group having positive optical power and a fifth lens group having positive optical power in this order from the object side, and by moving the second lens group, the third lens group and the fifth lens group for varying power.

The zoom lens disclosed in JP-A No. 2006-71993 achieves a variable power ratio of about ×5 but has the total angle of view at the wide-angle end of about 60°, which is not regarded as a wide angle of view. When bending the optical path by arranging a reflection optical element in the first lens group, a size of a space needed to bend an optical path (when the reflection optical element is a prism for example, it corresponds to an optical path length of the prism) depends on a beam height that is highest among the off-axial beam height on an incident surface of a reflection optical element and the off-axial beam height on an emergent surface of the reflection optical element, on sections including optical axes before and after the optical path is bent. Therefore, for making a space needed for the bending to be small, it is effective to arrange a negative lens at the object side of the reflection optical element, and to position an entrance pupil position to be closer to the object side. In the zoom lens disclosed in JP-A No. 2006-71993, it is difficult to make negative optical power of the negative lens positioned on the object side of the reflection optical element to be stronger, because an optical power of the first lens group is positive. Therefore, when providing a wider angle of view with the zoom lens disclosed in JP-A No. 2006-71993, a space needed for the bending is reluctantly increased.

The zoom lens disclosed in JP-A No. 2004-348082 achieves a wide angle of view exceeding 700, but has a variable power ratio of about ×3, which is not regarded as sufficient. In a negative-lead zoom type wherein the first lens group has negative optical power, it is easy to make an effective diameter of a lens closer to the object to be small, because an entrance pupil is generally positioned to be relatively close to the object. In the negative-lead zoom type, and there is also a merit suitable for a wider angle of view such as it can have a structure of a retro-focus type easily at the wide-angle end. However, the zoom lens disclosed in JP-A No. 2004-348082 varies its power by moving greatly a lens group including a diaphragm and positive optical power, which causes a problem that F-number is largely fluctuated due to varying power under the condition that an open aperture of a diaphragm has a fixed diameter. Therefore, for achieving higher variable power while controlling fluctuations of F-number to be within an allowable range, the zoom lens requires a mechanism to change a diameter of a diaphragm when varying its power.

Though the zoom lens disclosed in JP-A Nos. No. 5-107476 and No. 5-323196 has achieved simultaneously an angle of view of about 70° and a variable-power ratio exceeding ×7, its capability is not sufficient to be used for a still camera. Since negative optical power of the first lens group is relatively weak, an effective diameter of the first lens group tends to be large, which is a problem, and a space necessary for bending an optical path is not secured. Therefore, it is difficult for these zoom lenses to realize a thinner image pickup apparatus.

SUMMARY

The present invention has been achieved in view of the aforesaid situation, and an object of the invention is to provide a zoom lens, an image pickup apparatus equipped with the zoom lens, and the digital equipment equipped with the image pickup apparatus, where the zoom lens exhibits a wide angle of view such as a total angle of view exceeding 70° within the variable-power range, has the variable-power ratio of about ×7, and enables an image pickup apparatus to be thin by bending the optical path in the first lens group.

There is provided a zoom lens comprising, in order from an object side thereof: a first lens group having a negative optical power and comprising a reflection optical element for bending an optical path by almost 90 degrees; a second lens group having a positive optical power; a third lens group having a negative optical power; a fourth lens group having a positive optical power; and, a fifth lens group. The first lens group and the fourth lens group are positioned at a fixed distance in a direction of the optical axis from an image plane of the zoom lens for varying a power of the zoom lens from a wide-angle end to a telephoto end. At least the second lens group, the third lens group and the fifth lens group move along an optical axis thereof for varying a power of the zoom lens from a wide-angle end to a telephoto end so as to reduce a distance between the first lens group and the second lens group and a distance between the third lens group and the fourth lens group and to change a distance between the fourth lens group and the fifth lens group. The zoom lens satisfies a predetermined conditional expression relating to a focal length of the first lens group, and a focal length of the zoom lens at the wide-angle end.

These and other objects, features and advantages according to the present invention will become more apparent upon reading of the following detailed description along with the accompanied drawings.

BRIEF DESCRIPTIONS OF THE DRAWINGS

Embodiments will now be described, by way of example only, with reference to the accompanying drawings which are meant to be exemplary, not limiting, and wherein like elements numbered alike in several Figures, in which.

Figure 17:
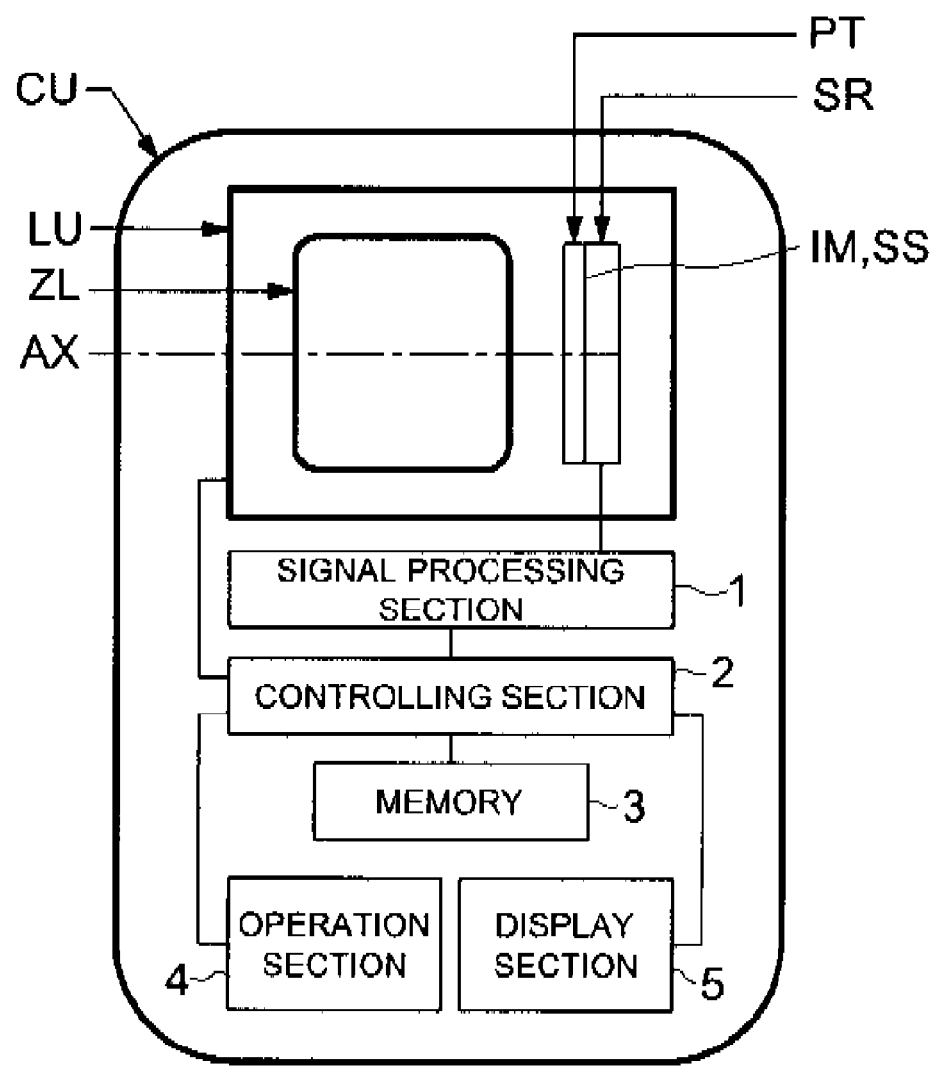

Each of FIGS. 11(A) to 11(E) shows a transverse aberration of Example 1 at the wide-angle end before and after image stabilization;

Each of FIGS. 12(A) to 12(E) shows a transverse aberration of Example 1 at the telephoto end before and after image stabilization;

Each of FIGS. 13(A) to 13(E) shows a transverse aberration of Example 4 at the wide-angle end before and after image stabilization;

Each of FIGS. 14(A) to 14(E) shows a transverse aberration of Example 4 at the telephoto end before and after image stabilization;

Each of FIGS. 15(A) to 15(E) shows a transverse aberration of Example 5 at the wide-angle end before and after image stabilization;

Each of FIGS. 16(A) to 16(E) shows a transverse aberration of Example 5 at the telephoto end before and after image stabilization; and FIG. 17 is a diagram showing an example of a schematic structure of a digital equipment carrying an image pickup apparatus.

DESCRIPTION OF THE PREFERRED EMBODIMENT

A zoom lens, an image pickup apparatus and a digital equipment as an preferred embodiment of the invention will be explained as follows, referring to the drawings. The zoom lens as an embodiment includes, a first lens group having a negative optical power and comprising a reflection optical element for bending an optical path by almost 90 degrees; a second lens group having a positive optical power; a third lens group having a negative optical power; a fourth lens group having a positive optical power; and, a fifth lens group. In the zoom lens, the first lens group and the fourth lens group are positioned at a fixed distance in a direction of the optical axis from an image plane of the zoom lens for varying a power of the zoom lens from a wide-angle end to a telephoto end. Further in the zoom lens, at least the second lens group, the third lens group and the fifth lens group move along an optical axis thereof for varying a power of the zoom lens from a wide-angle end to a telephoto end so as to reduce a distance between the first lens group and the second lens group and a distance between the third lens group and the fourth lens group and to change a distance between the fourth lens group and the fifth lens group. The zoom lens satisfies the following expression (1).

$$1.0 < |f1|/fw < 6.0 \tag{1}$$

In the expression (1), f1 is a focal length of the first lens group, and fw is a focal length of the zoom lens at the wide-angle end.

Features of the above preferred embodiment can realize a relatively compact zoom lens in which an optical path is bent and which exhibits total angle of view exceeding 70° within the variable-power range and has the variable-power ratio of about ×7, while keeping a high optical property within the all zoom region such as spherical aberration of 80 μm or lower, field curvature of 50 μm or lower, the maximum distortion of about 5%, and axial chromatic aberration (for g line) is about 100 μm. Therefore, this embodiment can provide a zoom lens providing the following property and an image pickup apparatus including the zoom lens: the zoom lens exhibits a wide angle of view such as the total angle of view exceeding 70° within the variable-power range, has the variable-power ratio of about ×7, and enables an image pickup apparatus to be thin by bending the optical path in the first lens group. Thus, by using the image pickup apparatus for a digital equipment such as a digital camera, it is possible to contribute to provide a thinner, lighter and more compact digital equipment with higher efficiencies and higher functions at a reduced cost.

For example, by providing the following structure, the embodiment can realize a higher variable power ratio and reduced size with good balance, which is preferable: the structure includes, in order from the object side, the first lens group having negative optical power, the second lens group having positive optical power, the third lens group having negative optical power, the fourth lens group having positive optical power and the fifth lens group, and further includes a reflection optical element bending an optical path by almost 90 degrees in the first lens group, in which a ratio of an optical power of the first lens group to a focal length of the total system of the zoom lens at the wide-angle end is configured to a proper value, the first lens group and the fourth lens group are positioned at a fixed distance in a direction of the optical axis from an image plane of the zoom lens for varying a power of the zoom lens from a wide-angle end to a telephoto end, and at least the second lens group, the third lens group and the fifth lens group move along an optical axis thereof for varying a power of the zoom lens from a wide-angle end to a telephoto end so as to reduce a distance between the first lens group and the second lens group and a distance between the third lens group and the fourth lens group and to change a distance between the fourth lens group and the fifth lens group. In other words, the aforesaid constitution can provide a relatively compact zoom lens of optical path bending type that exhibits a relatively wide angle of view within its variable-power range and has the variable-power ratio of about ×7, with keeping an excellent optical property throughout its variable-power region.

Conditional expression (1) stipulates a preferable conditional range for achieving a wide angle of view while keeping a zoom lens to be compact and for securing an excellent image-forming power throughout its variable-power range by using a ratio of a focal length of the first lens group to a focal length of an overall system of the zoom lens at a wide-angle end. When a value of the conditional expression (1) exceeds the upper limit, an optical power of the first lens group becomes too weak. Therefore, when the angle of view becomes wider, an aperture of the first lens group becomes greater undesirably, resulting in an increase of a space needed for bending the optical path. It prevents an image pickup apparatus from providing small thickness that is one of original objects, which is undesirable. Further, when the optical power of the first lens group becomes too weak, it is difficult to keep the total length of the optical system to be short with keeping a predetermined variable-power ratio, because change the distance between the first lens group and the second lens group does not provide sufficient action of varying power. In contrast to this, when a value of the conditional expression (1) falls below the lower limit, optical power of the first lens group becomes too strong, and it is difficult to correct aberrations such as curvature field and distortion, although it is preferable in the viewpoint of providing a compact zoom lens.

Therefore, this embodiment can realize a compact zoom lens which has excellent properties and enables an image pickup apparatus to be thin by bending the optical path in the first lens group, while keeping high variable-power ratio such that wide angle of view is exhibited in the range of the variable power. When an image pickup apparatus equipped with the aforesaid zoom lens is used in equipment such as a digital camera, it is possible to contribute to provide a thinner, lighter and more compact digital equipment with higher efficiencies and higher functions at a reduced cost. Preferable conditions for obtaining the aforesaid effects in a balanced manner and for achieving further higher optical properties will be explained as follows.

The zoom lens more preferably satisfies the following conditional expressions (1a) and (1b).

$$1.5 < |fl|/fw < 4.0 \quad (1a)$$

$$2.0 < |fl|/fw < 3.5 \quad (1b)$$

Each of these conditional expressions (1a) and (1b) stipulates a range of conditions which is based on the aforesaid viewpoints and is more preferable among each range of conditions stipulated by each of the aforesaid conditional expressions (1).

It is preferable that an optical diaphragm is arranged in an area that is defined by the surface closest to the image side in the second lens group and by the surface closest to the image side in the fourth lens group. In an ordinary negative-lead optical system having a variable-power ratio of about ×3 that varies its power by moving a lens group having a diaphragm, when trying to acquire high variable power while confining a fluctuation of F-number during varying power within an allowable range, an axial beam height in the lens group having the diaphragm becomes too high at the wide-angle end. Therefore, the optical system requires a mechanism capable of stopping down an aperture at the wide-angle end. On the other hand, in the zoom lens relating to the invention, the primary portion of power varying actions is distributed to the second lens group and the third lens group. It reduce a fluctuation in the axial beam height during varying power in the area closer to the image side than the third lens group. Therefore, the zoom lens relating to the invention does not need the aforesaid mechanism, because the fluctuation in the axial beam height during varying power is small in the optical diaphragm. When the value of F-number at the telephoto end is smaller than that of the desired F-number, it is possible to improve the property of the optical system by changing the F-number at a telephoto end to the desired F-number, by cutting off an axial light flux in the lens arranged closer to the object side than the lens group having the diaphragm.

It is preferable that the first lens group further comprises a negative lens arranged on the object side of the reflection optical element and including an object-side surface and an image-side surface which is a concave surface having a larger curvature than the object-side surface, and that the negative lens of the first lens group satisfies the following conditional expression (2). In other words, there are arranged, in order from the object side, the negative lens and the reflection optical element, in the preferable first lens group.

$$1.5 < |fL1|/fw < 5.0 \quad (2)$$

In the conditional expression (2), fL1 represents a focal length of the negative lens in the first lens group, and fw represents a focal length of an overall system of the zoom lens at the wide-angle end.

By arranging a negative lens with a relatively strong negative optical power at the closest position to the object side in the first lens group, it is possible to position an entrance pupil to be relatively closer to the object side. As the result, a beam height of an off-axis light flux that enters the reflection optical element is reduced, and thereby, it can reduce the space for bending the optical axis. Conditional expression (2) prescribes a range of conditions preferable for minimizing a space needed for bending the optical path while keeping an excellent image forming power, by using a ratio of a focal length of the negative lens to a focal length of the overall system of the zoom lens at the wide-angle end. When a value of the conditional expression (2) exceeds the upper limit, optical power of the negative lens becomes too weak, and a space needed for bending the optical path is increased. In contrast to this, when a value of the conditional expression (2) falls below its lower limit, optical power of the negative lens becomes too strong. It reduce a space needed for bending the optical path, but increases curvature of field and distortion generated on the negative lens excessively, resulting in difficult correction in lens systems thereafter. By satisfying the conditional expression (2), it is possible to make the reflecting optical element to be sufficiently small despite a wide-angle exceeding a field angle of 70°, resulting in achievement of thinner image pickup apparatuses.

It is further preferable that the following conditional expression (2a) is satisfied.

$$2.0 < |fL1|/fw < 4.0 \quad (2a)$$

This conditional expression (2a) prescribes a range of conditions that is based on the aforesaid viewpoint and is further preferable, among a range of conditions prescribed by the aforesaid conditional expression (2).

It is preferable that the first lens group further comprises: a negative lens arranged on the object side of the reflection optical element and comprising an object-side surface and an image-side surface which is a concave surface having a larger curvature than the object-side surface, and a single or a plurality of positive lens arranged on an image side of the reflection optical element. In other words, there are arranged, in order from the object side, the negative lens and the reflection optical element, in the preferable first lens group, and a single or a plurality of positive lens is arranged on an image side of the reflection optical element. It is further preferable that the single or the plurality positive lens satisfies the following expressions (3) and (4).

$$vd1p<26.0 \quad (3)$$

$$\theta g,F1p+0.001767\times vd1p-0.6477>0.01 \quad (4)$$

In expressions (3) and (4), $vd1p$ represents an average value of Abbe's number of the single or the plurality of positive lens in the first lens group, and $\theta g,F1p$ represents an average value of a partial dispersion ratio of the single or the plurality of positive lens in the first lens group, where the partial dispersion ratio is defined as $\theta g,F1p=(ng-nF)/(nF-nC)$, where ng, nF, nC are refractive indexes of the single or the plurality of positive lens for g line, F line, and C line, respectively.

It is preferable, on the point of correction of chromatic aberration, that at least one positive lens is arranged on the image side of the reflecting optical element, and an average value of Abbe number of the at least one positive lens in the first lens group satisfies conditional expression (3). When a value of the conditional expression (3) exceeds the upper limit, actions of correcting chromatic aberration generated by negative optical power in the first lens group run short. It causes difficulty in securing negative optical power necessary for the first lens group, while controlling chromatic aberration generated on the first lens group. Further, by satisfying conditional expression (4), the secondary spectrum of axial chromatic aberration at the telephoto end can be reduced effectively, because a refractive index on the at least one positive lens on the short wavelength side becomes high relatively.

It is preferable that the fourth lens moves in a perpendicular direction to an optical axis of the fourth lens to stabilize an image formed on the image plane. It is further preferable that the fourth lens group includes a partial lens group including a lens closest to the image side in the fourth lens group, and the partial lens group moves in a perpendicular direction to the optical axis of the partial lens group to stabilize an image formed on the image plane. Since the fourth lens group is positioned at a fixed distance from an image plane in the case of varying power, it is preferable, from the viewpoint of the mechanical structure and a structure of a mechanism for stabilizing image, that an image is stabilized by moving the fourth lens group or a part of the fourth lens group (namely, a partial lens group) in the direction perpendicular to the optical axis.

It is preferable that the third lens group includes at least one positive lens, and the at least one positive lens satisfies the following conditional expressions (5) and (6).

$$vd3p<26.0 \quad (5)$$

$$\theta g,F3p+0.001767\times vd3p-0.6477>0.01 \quad (6)$$

In the expressions (5) and (6), $vd3p$ represents an average of an Abbe number of the single or the plurality of positive lens of positive lens in the third lens group, and $\theta g,F3p$ represents an average of a partial deviation ratio of the single or the plurality of positive lens in the third lens group, and is defined as $\theta g,F3p=(ng-nF)/(nF-nC)$, where ng, nF, nC are refractive indexes of the single or the plurality of positive lens for g line, F line, and C line, respectively.

It is preferable, on the point of correction of chromatic aberration, to arrange so that an average value of Abbe numbers of the at least one positive lens in the third lens group may satisfy conditional expression (5). Further, by satisfying conditional expression (6), the secondary spectrum of axial chromatic aberration at the telephoto end can be reduced effectively, because a refractive index on the at least one positive lens on the short wavelength side becomes high relatively.

It is preferable that the zoom lens satisfies the following conditional expressions (7) and (8).

$$0.6<f2/|f1|<2.0 \quad (7)$$

$$0.2<(\beta 2t/\beta 2w)/(ft/fw)<0.5 \quad (8)$$

In the expressions (7) and (8), f1 represents a focal length of the first lens group, f2 represents a focal length of the second lens group, $\beta 2w$ represents a paraxial lateral magnification at the wide-angle end of the second lens group, $\beta 2t$ represents a paraxial lateral magnification at the telephoto end of the second lens group, fw represents a focal length of an overall system of the zoom lens at the wide-angle end and ft represents a focal length of an overall system of the zoom lens at the telephoto end.

Conditional expression (7) stipulates a preferable range of conditions for coping with both attaining a compact zoom lens and obtaining an excellent optical property throughout its variable-power region by using a ratio of a focal length of the second lens group to a focal length of the first lens group. When a value of the conditional expression (7) falls below the lower limit, optical power of the second lens group becomes too strong, and it becomes difficult to correct spherical aberration and curvature of field at the telephoto end generated on the second lens group. In contrast to this, when a value of the conditional expression (7) exceeds the upper limit, power of the second lens group becomes too weak, and it becomes difficult to keep the total optical length to be short at the telephoto end.

Conditional expression (8) stipulates a preferable range of conditions concerning power varying actions of the second lens group. When a value of the conditional expression (8) exceeds the upper limit, power varying actions of the second lens group become too strong, and it becomes difficult to correct curvature of field at the wide-angle end and spherical aberration at a telephoto end. In contrast to this, when a value of conditional expression (8) falls below its lower limit, power varying actions by the third lens group become too strong, which makes correction of spherical aberration at a wide-angle end to be difficult.

It is further preferable to satisfy the following conditional expressions (7a) and (8a).

$$0.8<f2/|f1|<1.5 \quad (7a)$$

$$0.25<(\beta 2t/\beta 2w)/(ft/fw)<0.4 \quad (8a)$$

Each of these conditional expressions (7a) and (8a) stipulates a range of conditions which is based on the aforesaid viewpoints and is further preferable among each range of conditions stipulated by each of the aforesaid conditional expressions (7) and (8).

It is preferable that the image pickup apparatus further includes a mechanical shutter arranged on the object side next to the fourth lens group, and the mechanical shutter is positioned at a fixed distance from the image plane for varying a power of the zoom lens. Owing to this structure, it is possible to statically position the mechanical shutter during varying power (in other words, fix the position of the mechanical shutter during varying power), which is preferable on the point of simplification of the mechanical structure.

A zoom lens relating to the invention is suitable to be used as an image pickup optical system for a digital equipment having an image inputting function (for example, a digital camera and a video camera). By combining this with an image pickup element, an image pickup apparatus that takes in images of a subject optically and outputs them as electric signal can be constructed. The image pickup apparatus is an optical apparatus that serves as a primary constituent element of a camera used in shooting a still image or an video of the subject, and it includes, in order from the object (subject) side, an image pickup optical system (zoom lens) forming an optical image of an object (subject) and an image pickup element for converting the optical image formed with the image pickup system into electric signal, for example.

As an example of the camera, there are given a digital camera, a video camera, a security camera, an onboard camera and a camera for a TV phone, and there are further given cameras which are embedded in or attached externally on digital equipment such as a personal computer, a portable information equipment (for example, a small-sized portable information equipment terminal such as a mobile computer, a cellphone and a portable information terminals) and their peripheral equipment (scanner, printer or the like). As is understood from these examples, it is not only possible to constitute a camera by using an image pickup apparatus, but also possible to add camera functions by mounting an image pickup apparatus on each equipment. For example, it is possible to constitute a digital equipment with a function of image inputting such as a cellphone with a camera.

FIG. 17 shows an example of a schematic structure of digital equipment CU (corresponding to a digital equipment with a function of image inputting such as a digital camera) with its schematic section. Image pickup apparatus LU mounted on digital equipment CU shown in FIG. 17 is equipped with: zoom lens ZL (corresponding to image pickup optical system) that forms optical image (image plane) IM of a subject on a power variable basis; parallel flat plate PT (corresponding to an optical filter such as an optical low-pass filter and infrared cut filter arranged if necessary, and to a cover glass of image pickup element SR); and image pickup element SR that has a light-receiving surface SS and converts optical image IM formed on light receiving surface SS by zoom lens ZL into electric signal. When digital equipment CU having a function of inputting an image is composed of the image pickup apparatus LU, the image pickup apparatus LU should be arranged inside its body usually. However, when realizing a camera function with the image pickup apparatus LU, an embodiment of the invention is not limited to that and can employ any embodiment satisfying the necessity to realize the camera function. For example, unitized image pickup apparatus LU can be constituted so that it may be mounted on or dismounted from a main body of digital equipment CU freely, or it may be mounted on the main body rotatably.

As image pickup element SR, a solid-state image pickup element such as CCD (Charge Coupled Device) having plural pixels or CMOS (Complementary Metal Oxide Semiconductor), for example, can be used. Since the zoom lens ZL is provided so that optical image IM of a subject may be formed on light-receiving surface SS of image pickup element SR, the optical image IM formed by the zoom lens ZL is converted into electric signal by the image pickup element SR.

The digital equipment CU is equipped with signal processing section 1, controlling section 2, memory 3, operation section 4 and display section 5, in addition to the image pickup apparatus LU. Signal generated by the image pickup element SR is subjected to prescribed digital image processing or image compression processing in the signal processing section 1, in case of need, and it is recorded as digital image signal on memory 3 such as a semiconductor memory and optical disc, or it is sometimes transferred to another equipment through cables or through conversion to infrared signal. The controlling section 2 is composed of a microcomputer, and it controls intensively a shooting function, an image reproduction function, and a lens moving mechanism for zooming and focusing. For example, the controlling section 2 controls image pickup apparatus LU so as to shoot at least one of a still image and video of the subject. The display section 5 is a section including a display such as a liquid crystal monitor, and it displays images by using image signals obtained through conversion by image pickup element SR or by using image information recorded on memory 3. The operation section 4 is a section including an operation member such as a manual operation button (for example, a release button) and an operation dial (for example, an operation mode dial), and it transmits information inputted by an operator for operation to the controlling section 2.

The zoom lens ZL has a zoom constitution including four lens groups of a negative first lens group, a positive second lens group, a negative third lens group and a positive fourth lens group, and further including a fifth lens group, as stated above. In the zoom lens ZL, plural lens groups move along optical axis AX to change a distance between lens groups for varying power of the zoom lens (namely, zooming). The optical image to be formed by the zoom lens ZL passes through an optical low-pass filter (corresponding to parallel flat plate PT shown in FIG. 17) having a predetermined cutoff frequency defined by a pixel pitch of the image pickup element SR. Thereby, a spatial frequency characteristics of the optical image is adjusted, so that so-called turnaround noises generated in the course of converting into electric signals may be minimized. Owing to this, generation of color moiré can be controlled. However, if performance in the periphery of the resolution-limit frequency is controlled, it is not necessary to be anxious about generation of a noise even when no optical low-pass filter is used, and it is not necessary to use an optical low-pass filter when a user takes or appreciates images by using a display system in which a noise is not so conspicuous (for example, a liquid crystal screen of a cellphone).

Next, a specific optical constitution of zoom lens ZL will be explained in detail, referring to the first-fifth embodiments. Each of FIG. 1-FIG. 5 shows lens arrangements of the zoom lens ZL at wide-angle end (W), midrange (M) and telephoto end (T) for each of the first-fifth embodiments. These zoom lenses ZL are constituted as a folded optical system, and each of FIG. 1-FIG. 5 shows each lens constitution with an optical section in the state that the optical path is unfolded.

Zoom lens ZL in each of the first, second and fifth embodiments is a five-group zoom lens forming optical image IM of an object onto image pickup element SR with variable power and having a negative lens group, a positive lens group, a negative lens group, a positive lens group, and a positive lens group. Zooming operation for the zoom lens ZL is conducted by changing a distance between lens groups (for example, surface-distances d7, d12, d15, d23, d25). Zoom lens ZL in each of the third and fourth embodiments is a six-group zoom lens forming optical image IM of an object onto image pickup element SR with variable power and having a negative lens group, a positive lens group, a negative lens group, a positive lens group, a negative lens group, and a positive lens group. Zooming operation of the zoom lens ZL is conducted by changing a distance between lens groups (surface-distances d7, d12, d15, d21 and d23).

Each of FIG. 1-FIG. 5 schematically shows a locus of movement for zooming of a moving group with solid lines m2, m3 and m5 in each embodiment. Each of loci m2, m3 and m5 for respective zooming movements shows each of movements of the second lens group Gr2, the third lens group Gr3 and the fifth lens group Gr5 in zooming from wide-angle end (W) to telephoto end (T) (namely, relative positional change to image plane IM).

For example, in each of the first, second and fifth embodiments, the second lens group Gr2 moves toward the object side monotonously, the third lens group Gr3 moves toward the image side monotonously and the fifth lens group Gr5 moves toward the image side monotonously, in the case of varying power from the wide-angle end (W) to the telephoto end (T) In each of the third and the fourth embodiments, the second lens group Gr2 moves toward the object side monotonously, the third lens group Gr3 moves toward the image side (namely, there exists a focal length positioned to be closer to the object side than a focal length at midrange (M) between the midrange (M) and telephoto end (T)), and the fifth lens group Gr5 moves monotonously toward the object side, when varying power from a wide-angle end (W) to telephoto end (T). Since the first lens group Gr1 and the fourth lens group Gr4 are statically positioned for zooming (namely, a fixed group) in any embodiment, at least the second lens group Gr2, the third lens group Gr3 and the fifth lens group Gr5 are moved along optical axis AX so that the distance between the first lens group Gr1 and the second lens group Gr2 and the distance between the third lens group Gr3 and the fourth lens group Gr4 may be reduced, and distance between the fourth lens group Gr4 and the fifth lens group Gr5 may be changed.

In every embodiment, the fifth lens group Gr5 represents a focusing component. Each of the first, second, fifth embodiments has the constitution wherein focusing for the short-range object is conducted by moving the fifth lens group Gr5 toward the object side, as shown with arrow mF in each of FIGS. 1, 2, and 5. Each of the third and fourth embodiments has the constitution wherein focusing for the short-range object is conducted by moving the fifth lens group Gr5 toward the image side, as shown with arrow mF in each of FIGS. 3 and 4.

Figure 1:
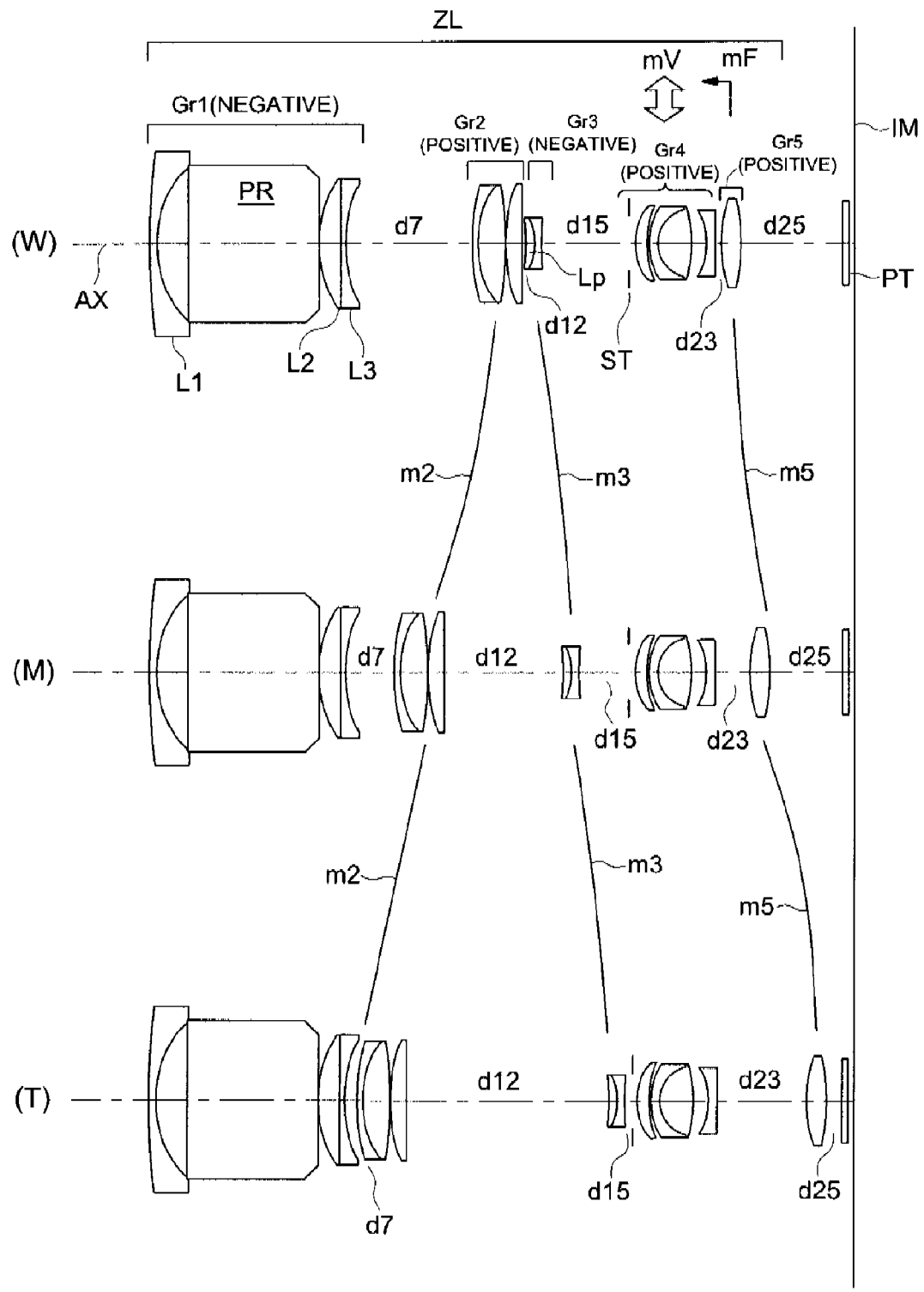
FIG. 1 is an optical schematic diagram of the first embodiment (Example 1)
Figure 2:
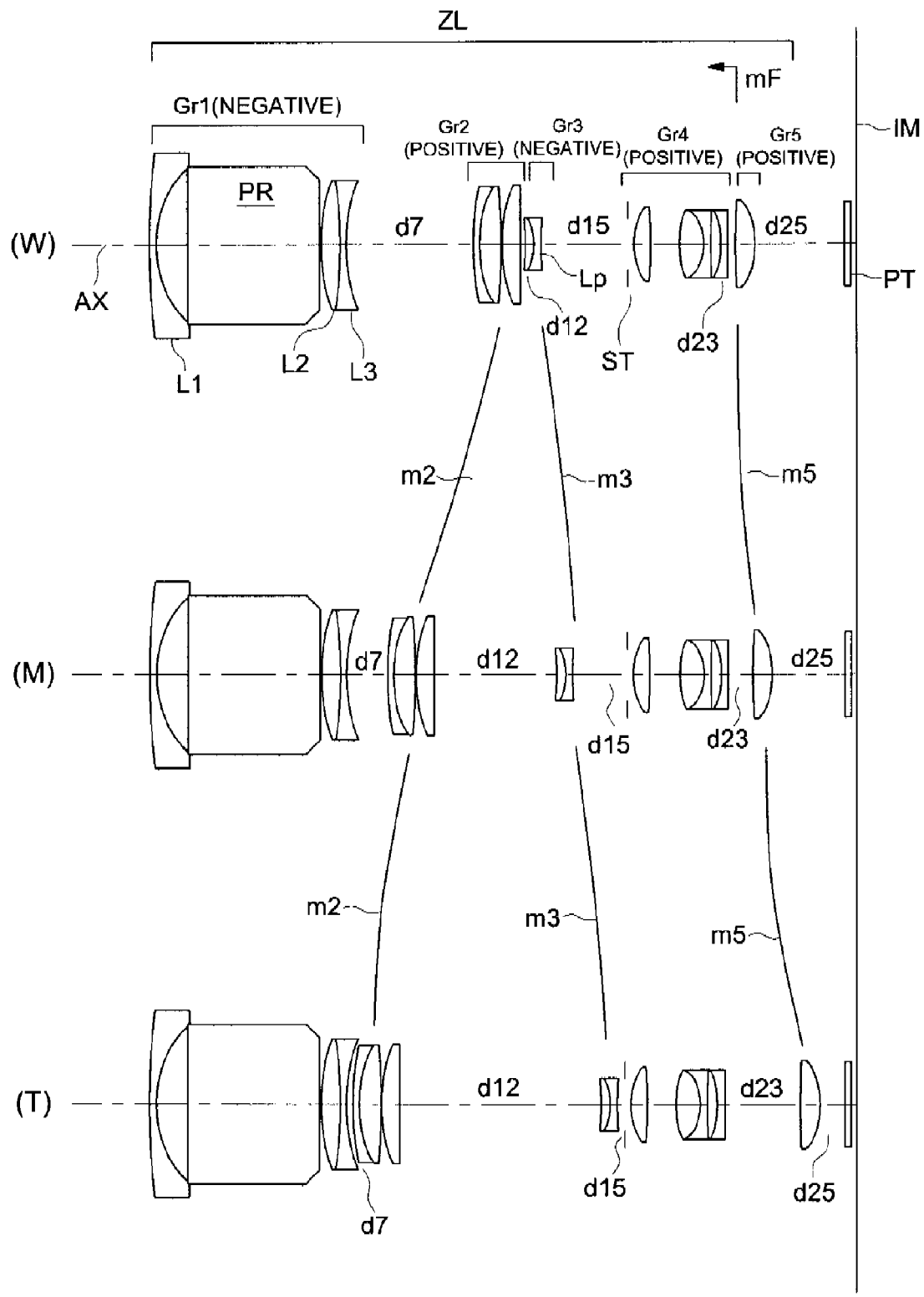
FIG. 2 is an optical schematic diagram of the second embodiment (Example 2)
Figure 3:
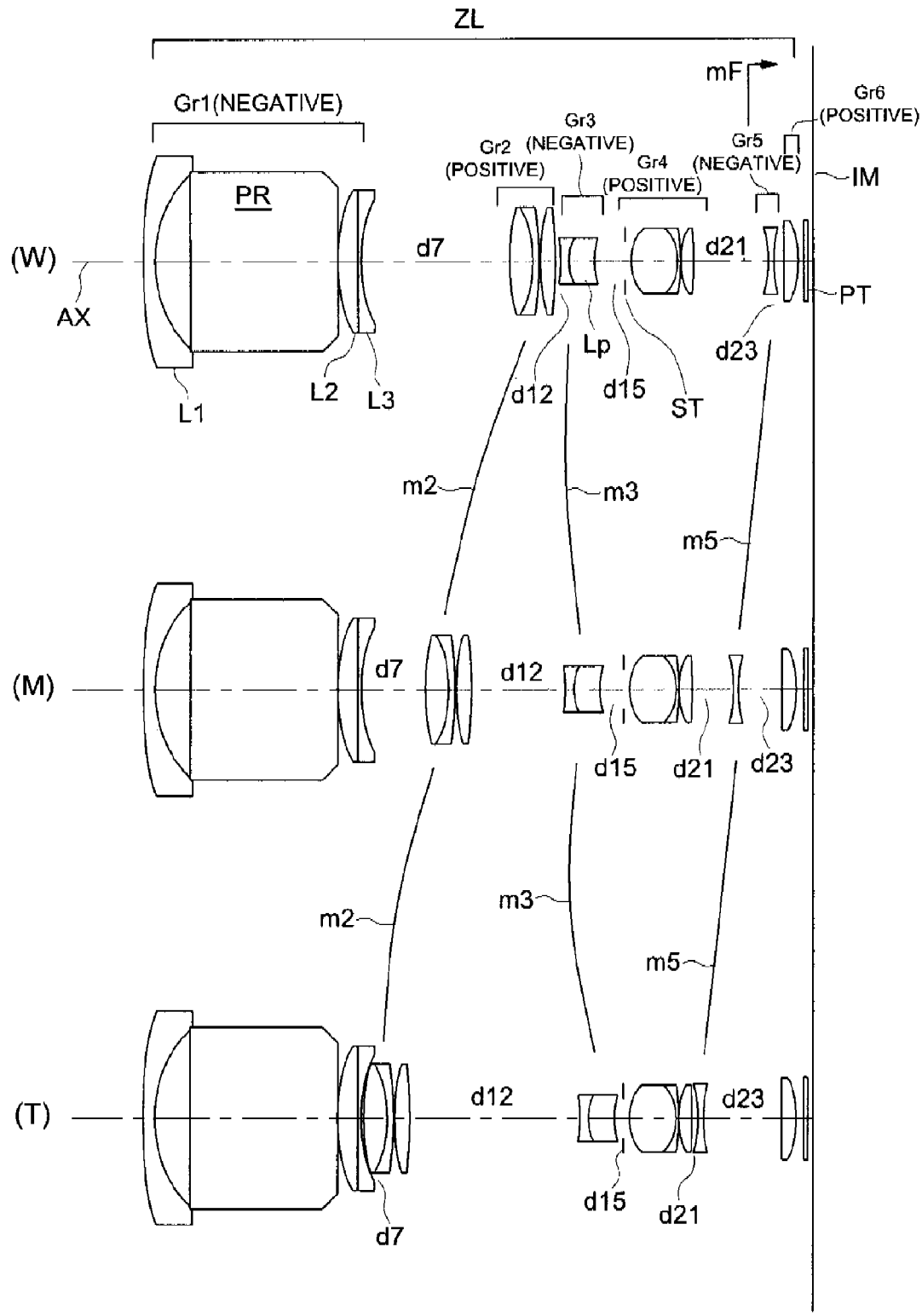
FIG. 3 is an optical schematic diagram of the third embodiment (Example 3)
Figure 4:
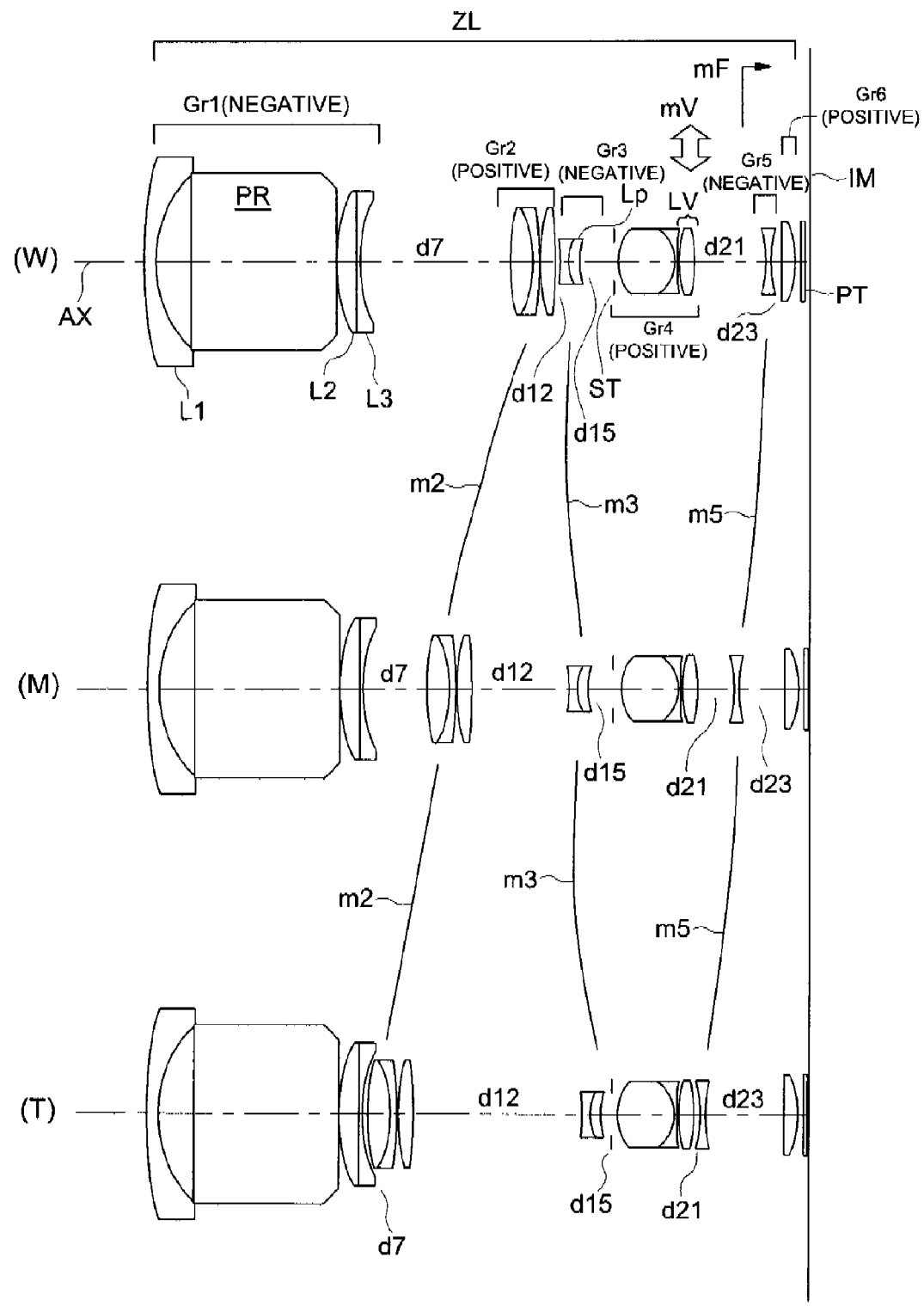
FIG. 4 is an optical schematic diagram of the second embodiment (Example 4)
Figure 5:
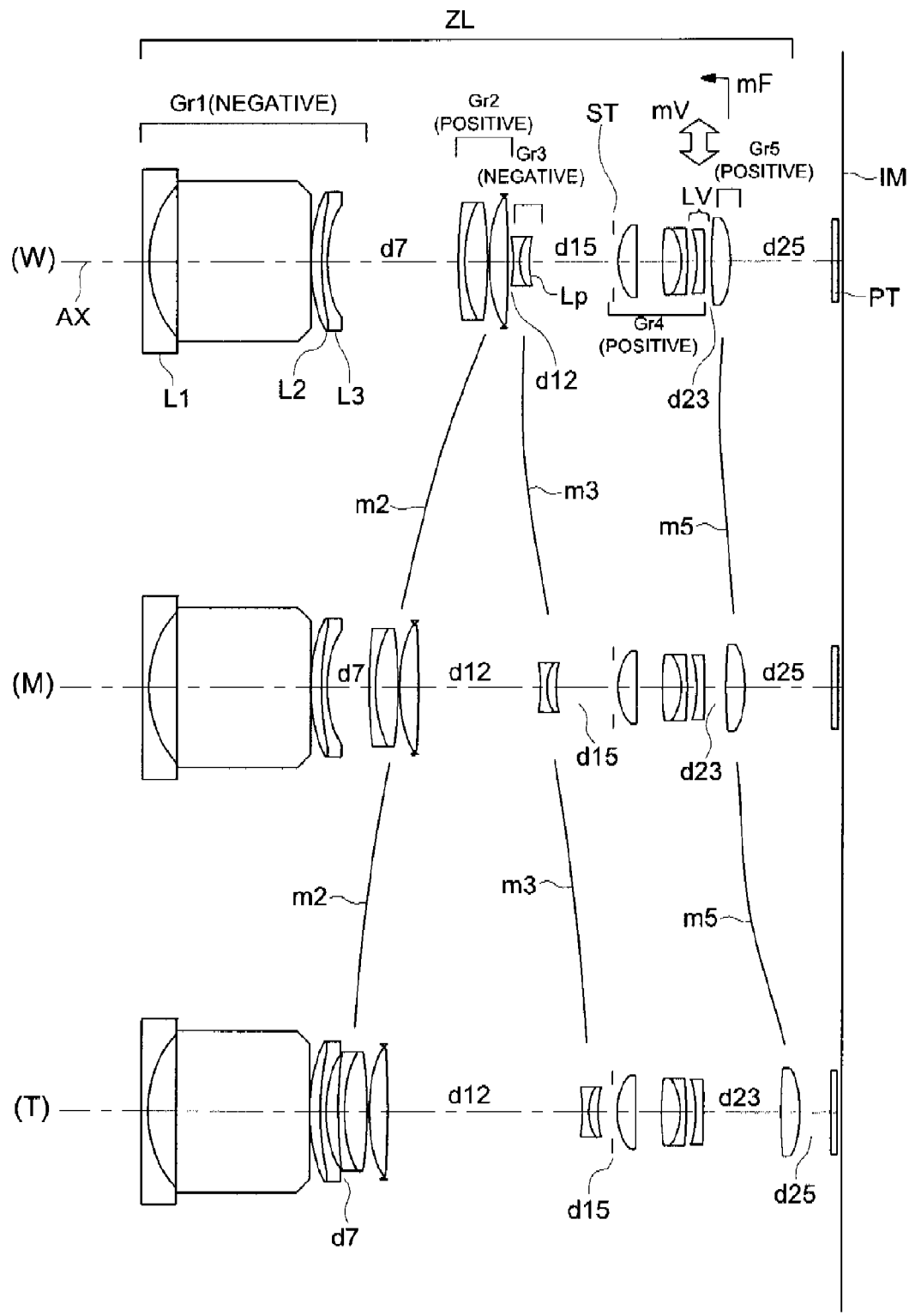
FIG. 5 is an optical schematic diagram of the second embodiment (Example 5)
Figure 6:
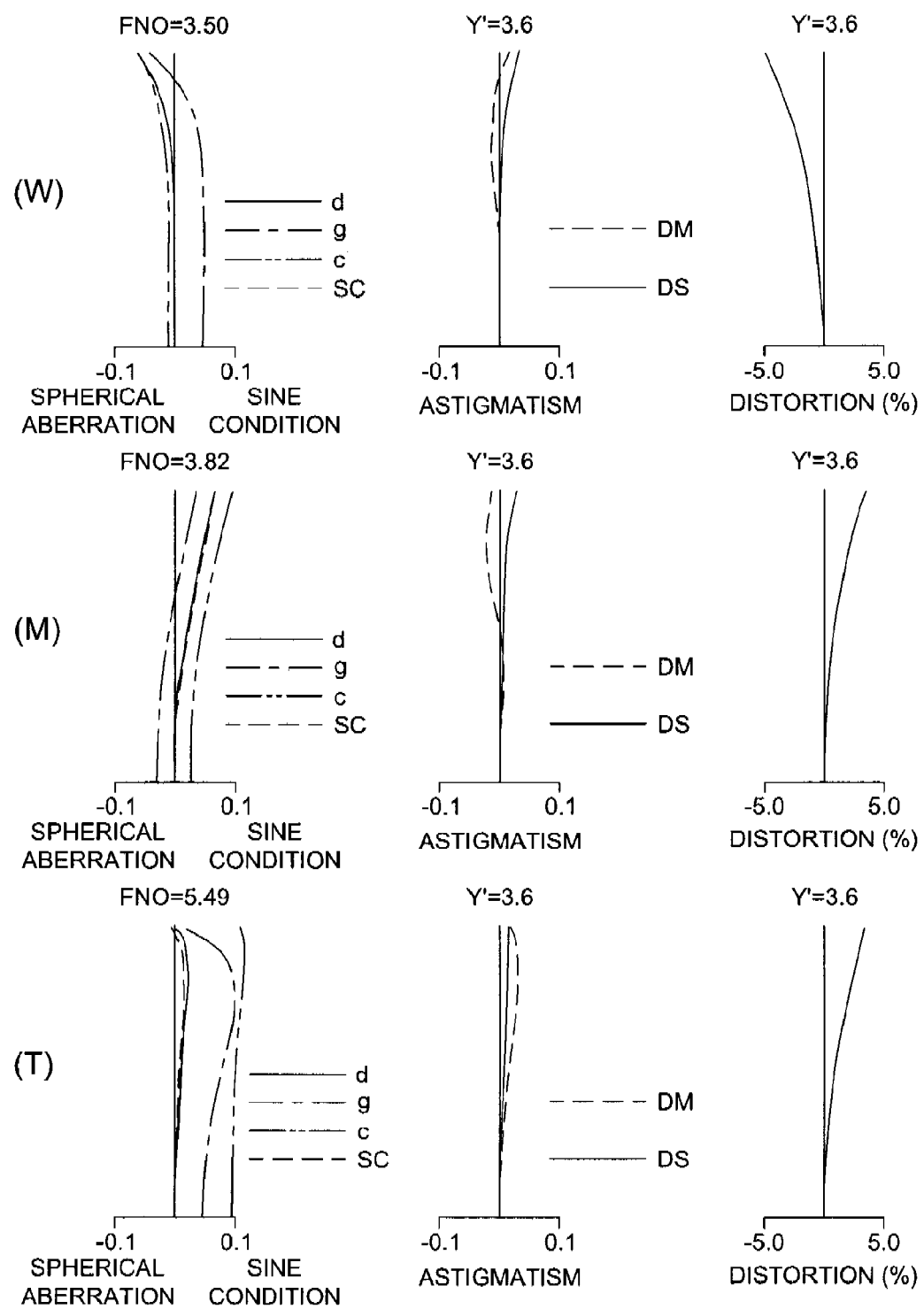
FIG. 6 is an aberration diagram of Example 1.
Figure 7:
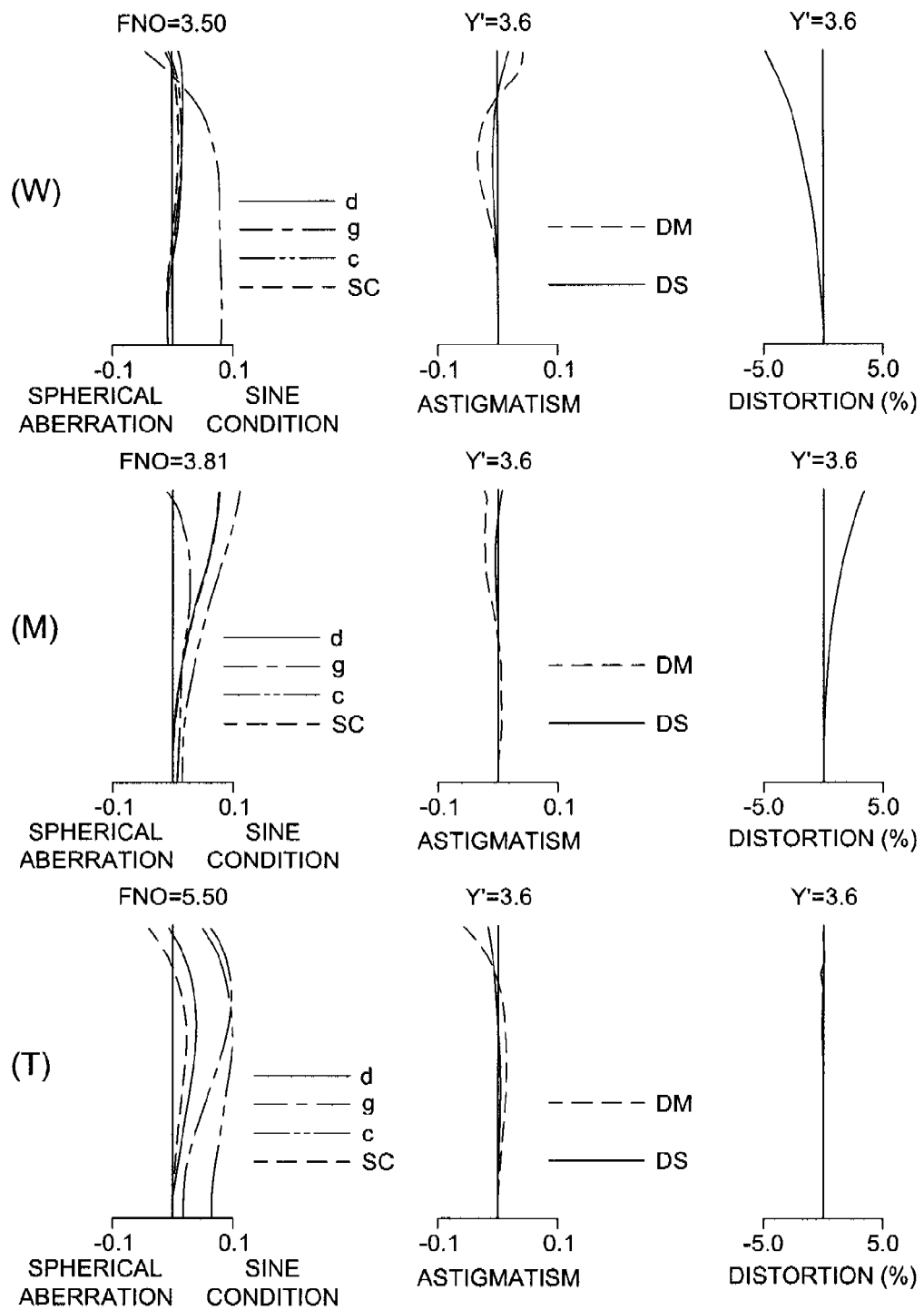
FIG. 7 is an aberration diagram of Example 2.
Figure 8:
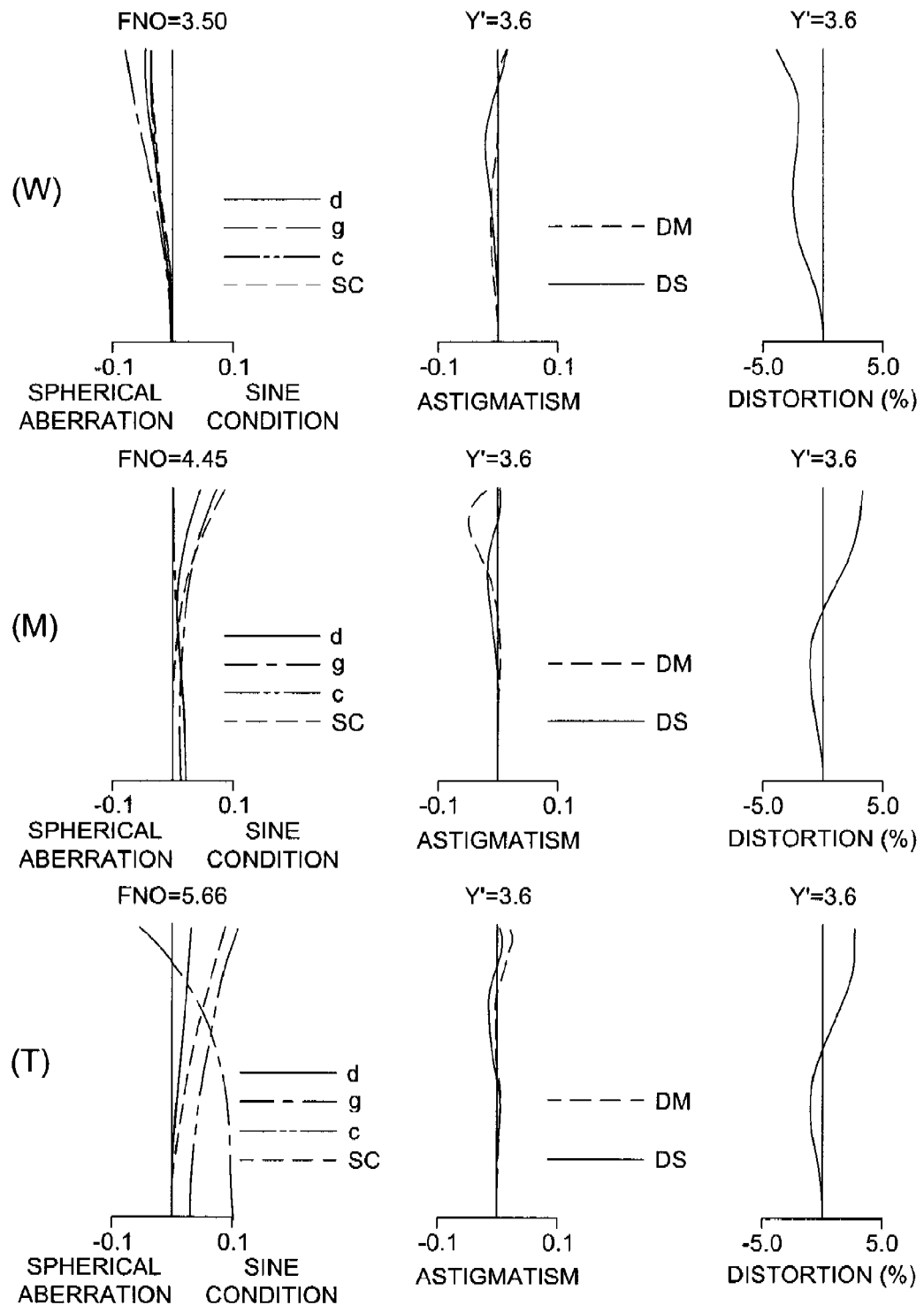
FIG. 8 is an aberration diagram of Example 3.
Figure 9:
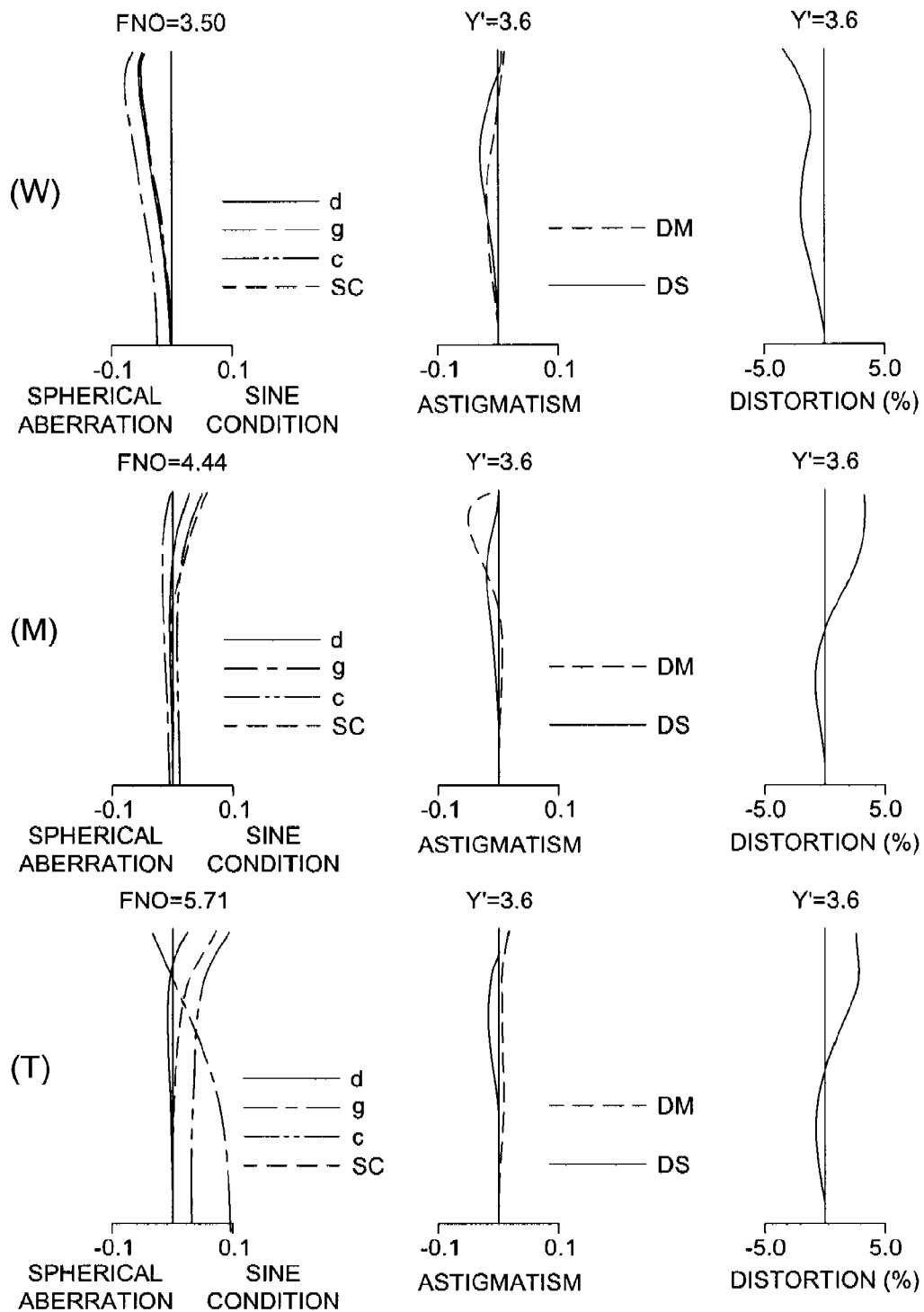
FIG. 9 is an aberration diagram of Example 4.
Figure 10:
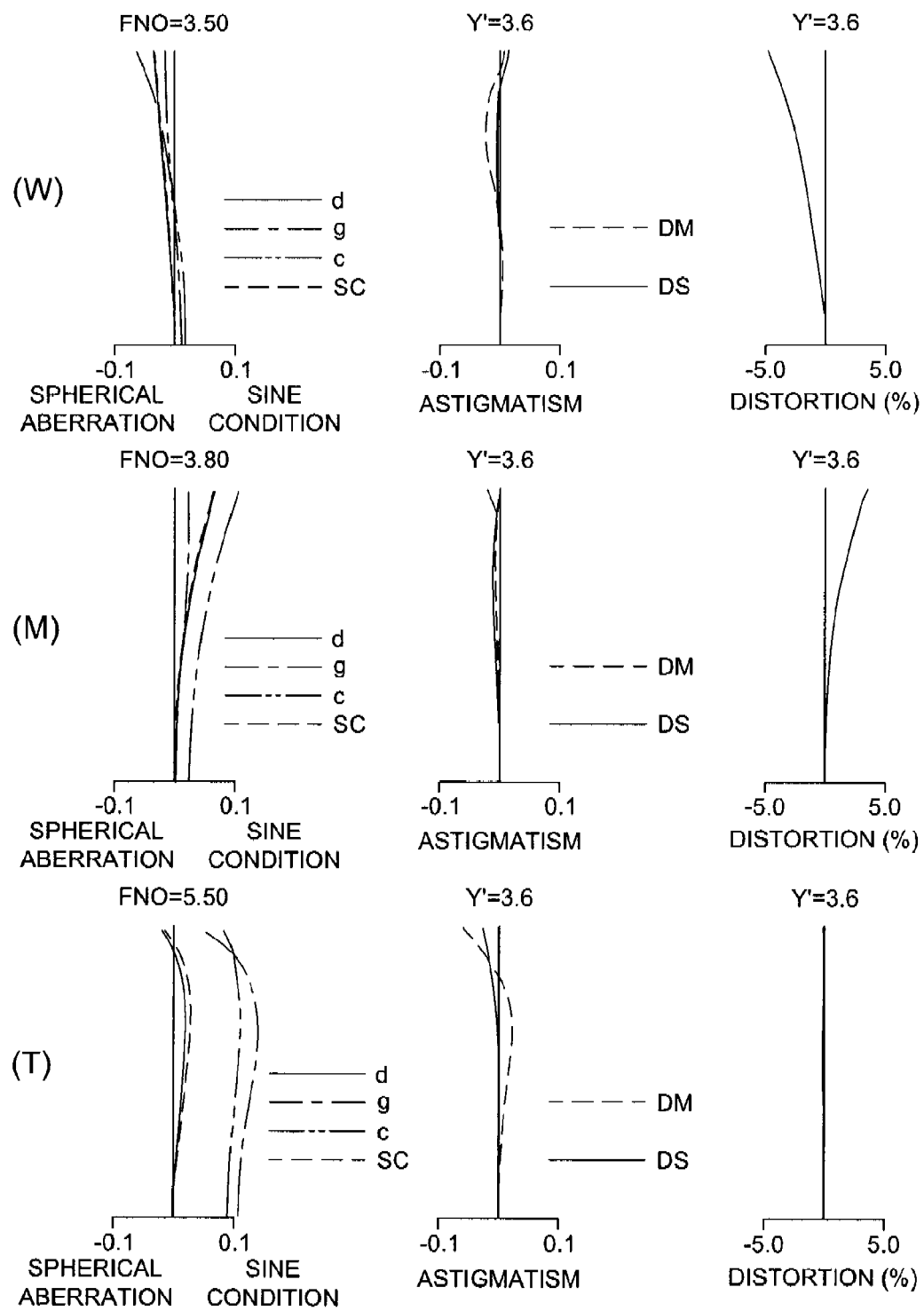
FIG. 10 is an aberration diagram of Example 5.
Figure 12:
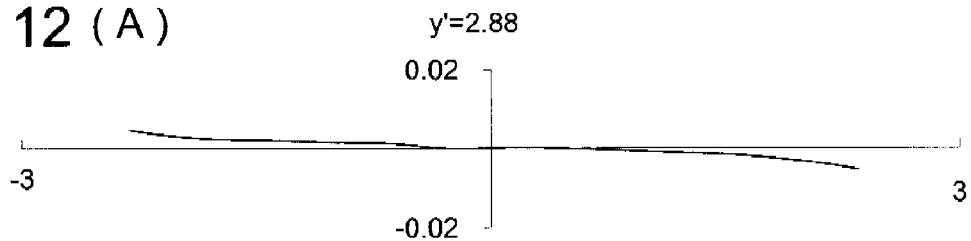
Figure 12:
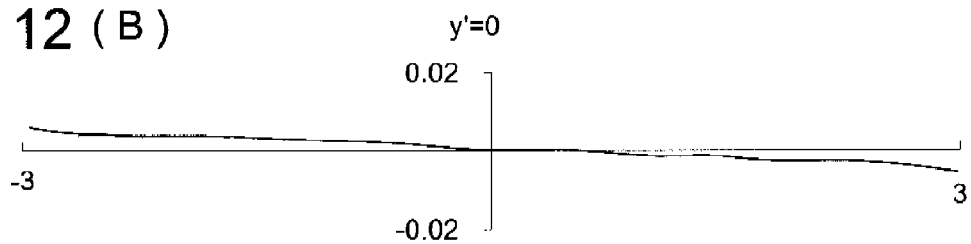
Figure 12:
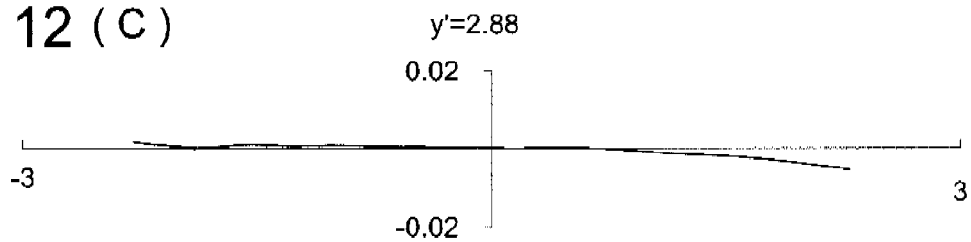
Figure 12:
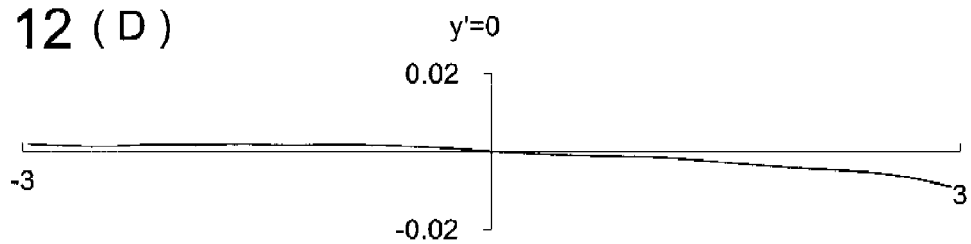
Figure 12:
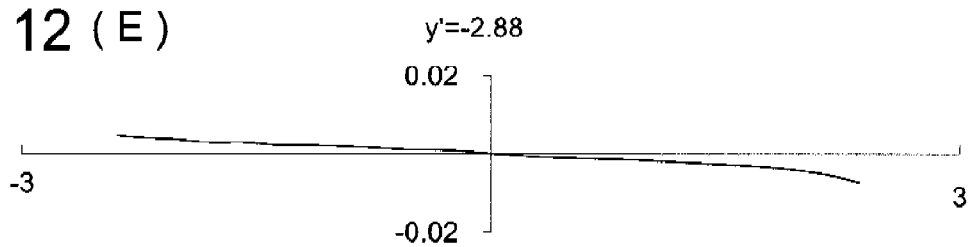
Figure 13:
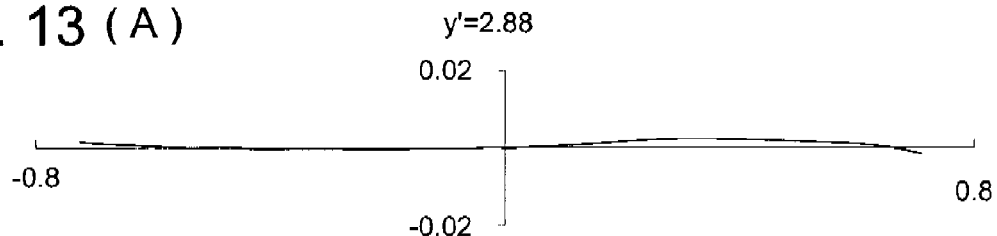
Figure 13:
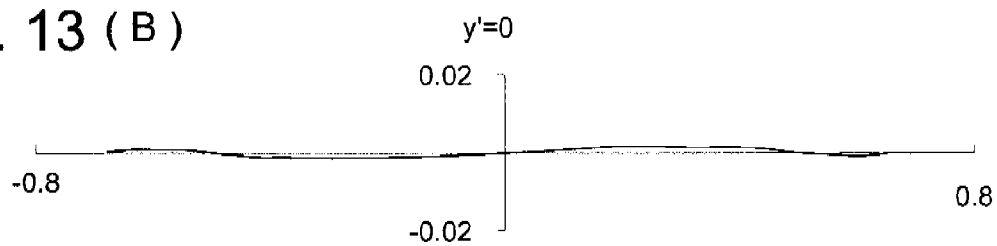
Figure 13:
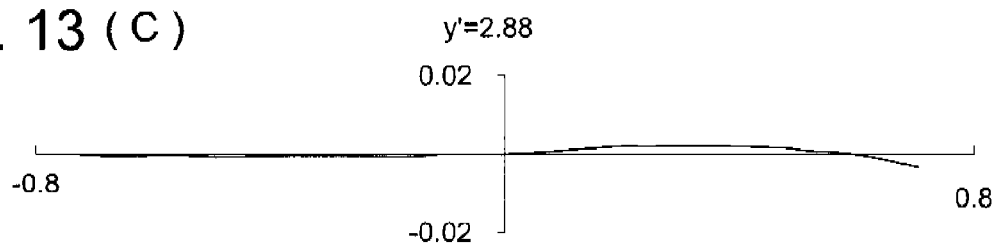
Figure 13:
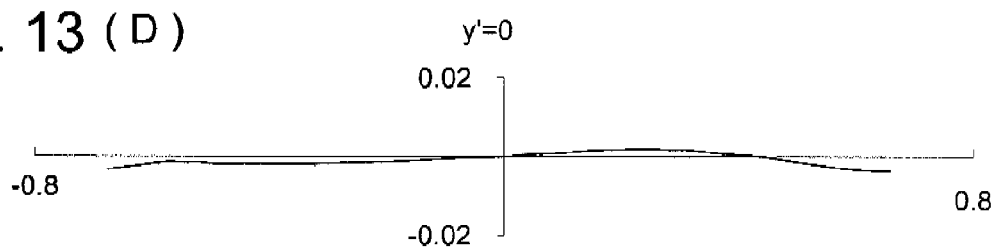
Figure 13:
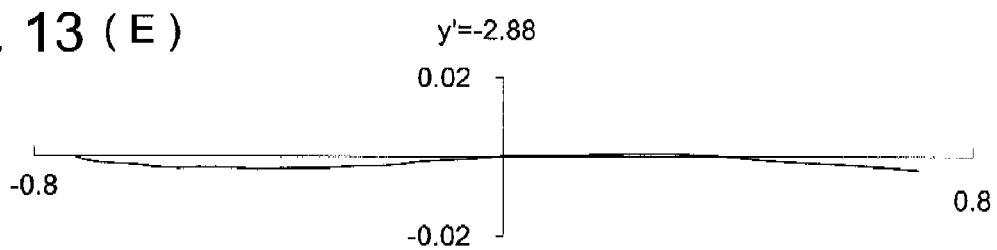
Figure 15:
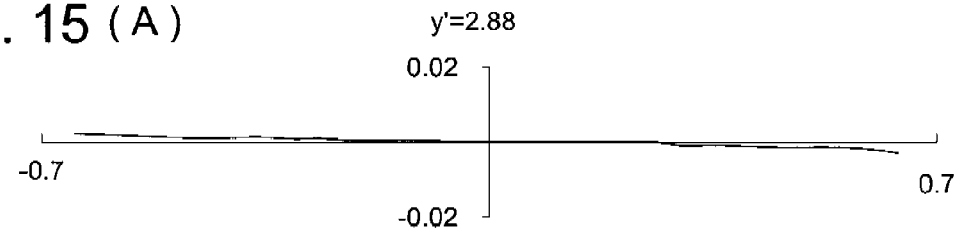
Figure 15:
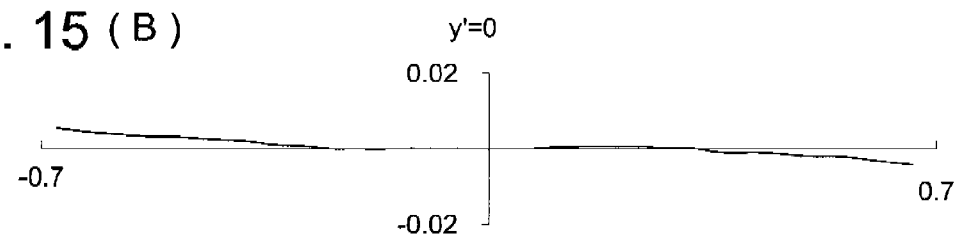
Figure 15:
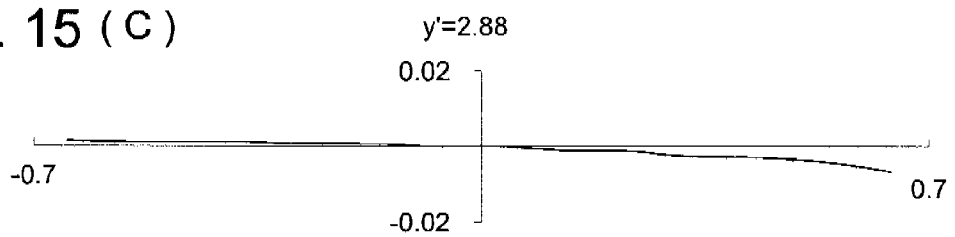
Figure 15:
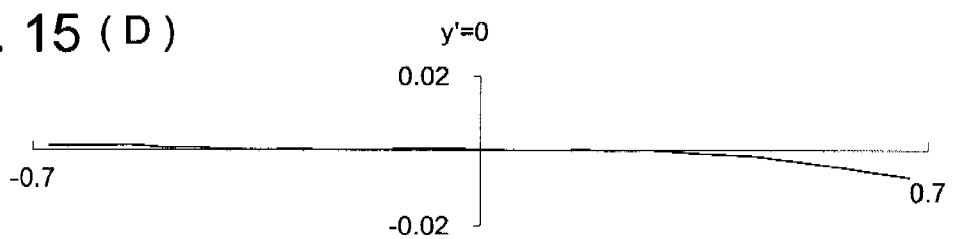
Figure 15:
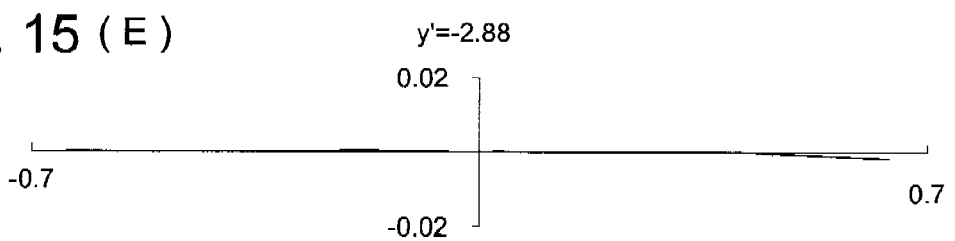

Each of the first embodiment, the fourth embodiment and the fifth embodiment has the structure for image stabilization provided by defining the fourth lens group Gr4 or its partial lens group LV as an image stabilizing lens group and moving the fourth lens group Gr4 or the partial lens group LV in the direction perpendicular to optical axis AX (outlined double arrows), as shown in FIG. 1, FIG. 4 and FIG. 5. For example, the first embodiment has the structure for stabilizing image formed on image plane IM provided by moving the whole of the fourth lens group Gr4 (as an image stabilizing lens group) in the direction perpendicular to optical axis AX. The fourth embodiment has the structure for stabilizing image formed on image plane IM provided by defining one positive lens positioned at the closest position to the image side in the fourth lens group as partial lens group LV (an image stabilizing lens group) and by moving the positive lens in the direction perpendicular to optical axis AX. The fifth embodiment has the structure for stabilizing image formed on image plane IM provided by defining one negative lens positioned at the closest position to the image side in the fourth lens group as a partial lens group LV (an image stabilizing lens group) and by moving the negative lens in the direction perpendicular to optical axis AX.

Even for every embodiment, the fourth lens group Gr4 has a diaphragm (corresponding to an aperture stop) ST arranged to be closest to the object. In other words, diaphragm ST is arranged on the object side next to the fourth lens group Gr4. Since the diaphragm ST is statically arranged with the fourth lens group Gr4 while keeping the constant distance along optical axis AX from image plane IM in zooming operation from wide-angle end (W) to telephoto end (T) in the constitution, the diaphragm ST can be considered as a part of the fourth lens group Gr4. Mechanical shutter SH that is statically arranged for zooming operation together with the fourth lens group Gr4, is arranged on the object side next to the fourth lens group Gr4 as occasion demands. Because diaphragm ST is also arranged on the object side next to the fourth lens group Gr4, mechanical shutter SH and diaphragm ST can be unitedly formed as one body. Lens constitutions in respective embodiments will be explained in detail as follows.

In the first embodiment (FIG. 1), each lens group is constituted as follows. The first lens group Gr1 is composed of a negative meniscus lens (first lens L1) whose concave surface is an aspheric surface and faces the image side, prism PR, and of a cemented lens including a positive meniscus lens (second lens L2) whose convex surface faces the object side and a negative meniscus lens (third lens L3) whose concave surface faces the image side, in this order from the object side. The second lens group Gr2 is composed of a cemented lens including a negative meniscus lens whose concave surface faces the image side and a biconvex positive lens, and of a biconvex positive lens, in this order from the object side. The third lens group Gr3 is composed of a cemented lens having therein a positive meniscus lens whose convex surface faces the image side (positive lens Lp) and a biconcave negative lens, in this order from the object side. The fourth lens group Gr4 is composed of diaphragm ST, a positive meniscus lens whose convex surface faces the object side, a cemented lens having therein a negative meniscus lens whose concave surface faces the image side and a biconvex positive lens, and of a negative meniscus lens having an aspheric surface facing the image side and a concave surface facing the object side, in this order from the object side. The fifth lens group Gr5 is composed of one biconvex positive lens whose surface facing the object side is an aspheric surface.

In the second embodiment (FIG. 2), each lens group is constituted as follows. The first lens group Gr1 is composed of a negative meniscus lens (first lens L1) whose concave surface is an aspheric surface and faces the image side, prism PR, and of a cemented lens including a biconvex positive lens (second lens L2) and a biconcave negative lens (third lens L3), in this order from the object side. The second lens group Gr2 is composed of a cemented lens having therein a negative meniscus lens whose concave surface faces the image side and a biconvex positive lens, and of a biconvex positive lens, in this order from the object side. The third lens group Gr3 is composed of a cemented lens having therein a positive meniscus lens (positive lens Lp) whose convex surface faces the image side and a biconcave negative lens, in this order from the object side. The fourth lens group Gr4 is composed of diaphragm ST, a biconvex positive lens, a cemented lens having therein a biconvex positive lens and a biconcave negative lens, and of a negative meniscus lens having an aspheric surface facing the image side and a concave surface facing the object side, in this order from the object side. The fifth lens group Gr5 is composed of one biconvex positive lens whose surface facing the object side is an aspheric surface.

In the third embodiment (FIG. 3), each lens group is constituted as follows. The first lens group Gr1 is composed of a negative meniscus lens (first lens L1) whose concave surface is an aspheric surface and faces the image side, prism PR, and of a cemented lens including a positive meniscus lens (second lens L2) whose convex surface faces the object side and a negative meniscus lens (third lens L3) whose concave surface faces the image side, in this order from the object side. The second lens group Gr2 is composed of a cemented lens having therein a biconvex positive lens and a negative meniscus lens whose concave surface faces the object side, and of a biconvex positive lens, in this order from the object side. The third lens group Gr3 is composed of a cemented lens having therein a biconcave negative lens and a positive meniscus lens (positive lens Lp) whose convex surface faces the object side. The fourth lens group Gr4 is composed of diaphragm ST, a cemented lens having therein a biconvex positive lens and a negative meniscus lens whose concave surface faces the object side, and of a biconvex positive lens whose surface facing the image side is an aspheric surface, in this order from the object side. The fifth lens group Gr5 is composed of one biconcave negative lens. The sixth lens group Gr6 is composed of one positive meniscus lens whose convex surface faces the image side and whose opposing surfaces are aspheric surfaces.

In the fourth embodiment (FIG. 4), each lens group is constituted as follows. The first lens group Gr1 is composed of a negative meniscus lens (first lens L1) whose concave surface is an aspheric surface and faces the image side, prism PR, and of a cemented lens including a biconvex positive lens (second lens L2) and a biconcave negative lens (third lens L3), in this order from the object side. The second lens group Gr2 is composed of a cemented lens having therein a biconvex positive lens and a negative meniscus lens whose concave surface faces the object side, and of a biconvex positive lens in this order from the object side. The third lens group Gr3 is composed of a cemented lens having therein a biconcave negative lens and a positive meniscus lens (positive lens Lp) whose convex surface faces the object side, in this order from the object side. The fourth lens group Gr4 is composed of diaphragm ST, a cemented lens having therein a biconvex positive lens and a negative meniscus lens whose concave surface faces the object side, and of a biconvex positive lens (partial lens group LV), in this order from the object side. The fifth lens group Gr5 is composed of one biconcave negative lens. The sixth lens group Gr6 is composed of one positive meniscus lens whose convex surface faces the image side and whose opposing surfaces are aspheric surfaces.

In the fifth embodiment (FIG. 5), each lens group is constituted as follows. The first lens group Gr1 is composed of a negative meniscus lens (first lens L1) whose concave surface is an aspheric surface and faces the image side, and of prism PR, and of a cemented lens including a positive meniscus lens (second lens L2) whose convex surface faces the object side and a negative meniscus lens (third lens L3) whose concave surface faces the image side, in this order from the object side. The second lens group Gr2 is composed of a cemented lens having therein a negative meniscus lens whose concave surface faces the image side and a biconvex positive lens, and of a biconvex positive lens, in this order from the object side. The third lens group Gr3 is composed of a cemented lens having therein a biconcave negative lens and a positive meniscus lens (positive lens Lp) whose convex surface faces the object side, in this order from the object side. The fourth lens group Gr4 is composed of diaphragm ST, a positive meniscus lens whose convex surface faces the object side, of a cemented lens having therein a biconvex positive lens and a negative meniscus lens having a concave surface facing the object side and an aspheric surface facing the image side, and of a biconcave negative lens (partial lens group LV), in this order from the object side. The fifth lens group Gr5 is composed of one biconvex positive whose surface facing the object side is an aspheric surface.

Zoom lens ZL in each embodiment has the structure of a folding optical system including prism PR bending optical axis AX by almost 90° in the first lens group Gr1 as a optical-path bending element. The prism PR includes a reflection surface that bends a light flux by almost 90°, and the reflection surface bends an optical path for using the zoom lens ZL as a folded optical system. At that case, the light flux is reflected so that the optical axis AX may be bent by almost 90° (namely, by 90°, or substantially 90°). If the reflection surface for bending an optical path is provided in an optical path of zoom lens ZL in the aforesaid manner, a degree of freedom for arrangement of image pickup apparatus LU is enhanced, and thin image pickup apparatus LU in appearance can be achieved by changing the dimension in the thickness direction of image pickup apparatus LU. Incidentally, a position where an optical path is bent may also be determined at a front side or a rear side of zoom lens ZL in case of need, without being limited to the middle of the zoom lens ZL. By bending the optical path properly, it is possible to effectively achieve a thin or compact appearance of digital equipment CU on which image pickup apparatus LU is mounted.

In each embodiment, prism PR representing a reflection optical element is used as a optical-path bending element for bending optical axis AX and has the structure bending a light flux with one reflecting surface so as to bent optical axis AX of zoom lens ZL by almost 90°. The reflection optical element including the reflection surface may also be mirrors such as plane mirrors, for example, without being limited to prisms such as rectangular prisms. Further, the number of reflection surfaces owned in the optical-path bending element may also be two or more. In other words, it is also possible to use a reflection optical element that reflects a light flux so that optical axis AX of zoom lens ZL may be bent by almost 90° with two or more reflection surfaces. An optical action for bending an optical path is not limited to refection, and it may also be refraction, diffraction or combination thereof. In other words, it is also possible to use an optical-path bending element having a reflection surface, a refraction interface, a diffraction surface or a combination of two or more of them. Though the prism PR used in each embodiment has no optical power, it is also possible to provide the optical-path bending element bending the optical path with optical power. For example, by distributing a part of the optical power of the zoom lens ZL to a surface such as a reflection surface, a light entering surface, light emerging surface of the prism, and a reflection surface of a mirror, the optical power distributed to lens elements can be reduced, and thereby their optical capability can be improved.

EXAMPLES

Constitutions of zoom lenses as embodiments of the invention will be explained more specifically as follows, with citing construction data shown in Tables 1-5. Tables 1-5 show numerical value examples of Examples 1-5 which correspond respectively to the aforesaid First-Fifth Embodiments. Each of the optical structural diagrams indicating the First-Fifth Embodiments illustrated in FIG. 1-FIG. 5 shows a lens structure, optical path and zoom movement of corresponding Examples 1-5.

The construction data of each of Examples in Tables 1-5 includes columns of surface number, radius of curvature r (mm), axial surface-distance d (mm), refractive index nd for d line and Abbe's number vd for d line shown in this order from the left side. A surface labeled by the surface number followed by an asterisk "*" is an aspheric surface, and the surface is defined by the following expression (AS) that expresses a shape of an aspheric surface. Incidentally, as for terms of the expression whose data do not appear in the aspheric surface data in Tables 1-5, each of the terms has a coefficient with a value of 0. In all of the tables, E-n represents ×10$^{-n}$.

$$X(H)=(CO \cdot H^2)/(1+\sqrt{(1-(1+K) \cdot CO^2 H^2)})+\Sigma(Aj \cdot H^j) \quad (AS)$$

In the expression (AS), X(H) represents a displacement (measured from the apex of the surface) in the optical axis AX direction at a position of height H, H represents a height in the direction perpendicular to optical axis AX, CO represents a paraxial curvature (=1/r), K represents a conic constant, and Aj represents a $j^{th}$ order aspheric surface coefficient.

Tables 1-5 further show various types of data: zoom ratio, focal length (mm), F-number, half angle of view (°), image height (mm), total length of a lens (mm), BF (mm), and variable surface distances (mm); and zoom lens group data: focal lengths (mm) of lens groups. The data of BF used in the tables is defined to indicate a distance from a surface of a cover glass (corresponding to parallel flat plate PT) facing the image side to an image plane. Further, Table 6 shows values corresponding to the conditional expressions of respective Examples.

Each of FIG. 6-FIG. 10 is an aberration diagram corresponding to each of Example 1-Example 5, and shows aberrations (spherical aberration, astigmatism and distortion in this order from the left side) at the wide-angle end (W), the midrange (M) and telephoto end (T). In these figures, FIGS. 6, 9, 10 correspond to Examples in FIGS. 1, 4, and 5, respectively, and represent lateral aberration diagram before decentering lens (normal condition) and lateral aberration diagram at a condition when adjusting the focus to the infinity. In FIGS. 6-10, FNO represents F-number and Y' (mm) represents the maximum image height (corresponding to the distance from optical axis AX) on light-receiving surface SS of image pickup element SR. In the aberration diagrams, solid line d shows spherical aberration (mm) for d line, one-dot chain line g shows spherical aberration (mm) for g line, and broken line SC shows an amount of offence against the sine condition (mm). In the astigmatism diagram, broken line DM shows a meridional surface, solid line DS shows each astigmatism (mm) for d line on a sagittal surface. In the distortion diagram, a solid line shows distortion (%) for d line.

Each of FIGS. 11(A)-16(E) shows a transverse aberration diagram at a condition when adjusting the focus to the infinity before decentering lens (in a normal condition) and after decentering lens (in an image stabilizing condition), which corresponds to each of Examples 1, 4 and 5. FIGS. 11(A)-11(E) and FIGS. 12(A)-12(E) correspond to Example 1. FIGS. 13(A)-13(E) and FIGS. 14(A)-14(E) correspond to Example 4. FIGS. 15(A)-15(E) and FIGS. 16(A)-16(E) correspond to Example 5. In FIGS. 11(A)-16(E), FIGS. 11(A), 12(A), 13(A), 14(A), 15(A), 11(B), 12(B), 13(B), 14(B), and 15(B) show transverse aberration before decentering lens, and FIGS. 11(C)-11(E), 12(C)-12(E), 13(C)-13(E), 14(C)-14(E), and 15(C)-15(E) show transverse aberration after decentering lens, where y' (mm) represents an image height of image pickup element SR on light-receiving surface SS (which corresponds to a distance from optical axis AX). Each of FIGS. 11(A)-11(E), 13(A)-13(E) and 15(A)-15(E) shows deterioration of axial transverse aberration and deterioration of off-axis transverse aberration in the case of stabilizing image moved at an angle of 0.3° at the wide-angle end (W) with eccentricity of decentering lens component (namely, image stabilizing lens group), and each of FIGS. 12(A)-12(E), 14(A)-14(E) and 16(A)-16(E) shows deterioration of axial transverse aberration and deterioration of off-axis transverse aberration in the case of stabilizing image moved at an angle of 0.3° at the telephoto end (T) with eccentricity of the decentering lens component. As is apparent from FIGS. 11(A)-16(E), aberration deterioration is slight, and an excellent performance can be secured even under the state of stabilizing image.

TABLE 1

Example 1

Surface data

| Surface No. | r | d | nd | vd | θg, F |
|---|---|---|---|---|---|
| Object plane | ∞ | ∞ | | | |
| 1 | 96.245 | 0.700 | 1.85135 | 40.1 | |
| 2* | 9.751 | 3.340 | | | |
| 3 | ∞ | 13.550 | 1.90366 | 31.3 | |
| 4 | ∞ | 0.100 | | | |
| 5 | 13.448 | 2.000 | 1.84666 | 23.8 | 0.6191 |
| 6 | 54.819 | 0.600 | 1.90366 | 31.3 | |
| 7 | 13.002 | Variable | | | |
| 8 | 26.102 | 0.600 | 1.84666 | 23.8 | |
| 9 | 11.458 | 2.850 | 1.72916 | 54.7 | |
| 10 | −47.679 | 0.100 | | | |
| 11 | 20.173 | 1.620 | 1.72916 | 54.7 | |
| 12 | −1306.596 | Variable | | | |
| 13 | −16.096 | 0.920 | 1.94595 | 18.0 | 0.6544 |
| 14 | −6.817 | 0.600 | 1.88300 | 40.8 | |
| 15 | 14.752 | Variable | | | |
| 16 (Diaphragm) | ∞ | 0.500 | | | |
| 17 | 5.887 | 1.350 | 1.80420 | 46.5 | |
| 18 | 10.616 | 0.190 | | | |
| 19 | 7.161 | 0.750 | 1.80610 | 40.7 | |
| 20 | 3.454 | 3.750 | 1.49700 | 81.6 | |
| 21 | −20.703 | 1.570 | | | |
| 22 | −6.025 | 0.700 | 1.60700 | 27.1 | |
| 23* | −268.109 | Variable | | | |
| 24* | 14.987 | 2.150 | 1.53048 | 55.7 | |
| 25 | −18.498 | Variable | | | |
| 26 | ∞ | 0.500 | 1.51680 | 64.2 | |
| 27 | ∞ | BF | | | |
| Image plane | ∞ | | | | |

Aspheric surface data

| | |
|---|---|
| $2^{nd}$ surface | K = 0.0000 |
| | A4 = −1.2818E−04 |
| | A6 = −1.0863E−06 |
| | A8 = 8.1760E−09 |
| | A10 = −1.8561E−10 |
| $23^{rd}$ surface | K = 0.0000 |
| | A4 = 9.7803E−04 |
| | A6 = −1.0548E−06 |
| | A8 = 5.4289E−07 |
| | A10 = −8.9569E−08 |
| $24^{th}$ surface | K = 0.0000 |
| | A4 = −6.8701E−09 |
| | A6 = 3.5790E−08 |
| | A8 = −1.8047E−07 |
| | A10 = 6.0633E−09 |

TABLE 1-continued

Example 1

Various types of data
Zoom ratio 6.8

|  | (W) Wide-angle | (M) Middle | (T) Telephoto |
|---|---|---|---|
| Focal length | 4.743 | 13.414 | 32.255 |
| F-number | 3.500 | 3.819 | 5.490 |
| Half angle of view | 38.622 | 14.531 | 6.168 |
| Image height | 3.600 | 3.600 | 3.600 |
| Total length of lens | 73.500 | 73.500 | 73.500 |
| BF | 0.500 | 0.500 | 0.500 |
| d7 | 13.3206 | 5.0881 | 1.1747 |
| d12 | 0.6088 | 12.3146 | 20.9274 |
| d15 | 9.1727 | 5.6993 | 1.0000 |
| d23 | 0.7152 | 3.5247 | 9.4833 |
| d25 | 10.7428 | 7.9332 | 1.9747 |

Zoom lens group data

| Group | Forefront surface | Focal length |
|---|---|---|
| 1 | 1 | −11.812 |
| 2 | 8 | 13.956 |
| 3 | 13 | −8.950 |
| 4 | 16 | 14.460 |
| 5 | 24 | 15.963 |
| 6 | 26 | — |

TABLE 2

Example 2

Surface data

| Surface No. | r | d | nd | vd | θg, F |
|---|---|---|---|---|---|
| Object plane | ∞ | ∞ |  |  |  |
| 1 | 349.546 | 0.700 | 1.82114 | 24.1 |  |
| 2* | 11.047 | 3.000 |  |  |  |
| 3 | ∞ | 13.850 | 1.90366 | 31.3 |  |
| 4 | ∞ | 0.100 |  |  |  |
| 5 | 25.715 | 2.000 | 1.92286 | 20.9 | 0.6388 |
| 6 | −52.076 | 0.600 | 1.80610 | 33.3 |  |
| 7 | 19.218 | Variable |  |  |  |
| 8 | 39.746 | 0.600 | 1.84666 | 23.8 |  |
| 9 | 13.291 | 2.460 | 1.72916 | 54.7 |  |
| 10 | −65.314 | 0.100 |  |  |  |
| 11 | 16.957 | 1.950 | 1.72916 | 54.7 |  |
| 12 | −181.542 | Variable |  |  |  |
| 13 | −14.476 | 0.908 | 1.92286 | 20.9 | 0.6388 |
| 14 | −6.657 | 0.600 | 1.80420 | 46.5 |  |
| 15 | 13.066 | Variable |  |  |  |
| 16 (Diaphragm) | ∞ | 0.500 |  |  |  |
| 17 | 6.933 | 1.820 | 1.58144 | 40.9 |  |
| 18 | −94.510 | 2.860 |  |  |  |
| 19 | 8.175 | 2.800 | 1.49700 | 81.6 |  |
| 20 | −4.927 | 0.600 | 1.80518 | 25.5 |  |
| 21 | 58.521 | 1.030 |  |  |  |
| 22 | −7.794 | 0.700 | 1.60700 | 27.1 |  |
| 23* | −118.211 | Variable |  |  |  |
| 24* | 75.574 | 2.250 | 1.53048 | 55.7 |  |
| 25 | −8.393 | Variable |  |  |  |

TABLE 2-continued

Example 2

| 26 | ∞ | 0.500 | 1.51680 | 64.2 |
| 27 | ∞ | BF |  |  |
| Image plane | ∞ |  |  |  |

Aspheric surface data

| $2^{nd}$ surface | K = 0.0000 |
|  | A4 = −1.0262E−04 |
|  | A6 = −1.0226E−06 |
|  | A8 = 1.0248E−08 |
|  | A10 = −9.6537E−11 |
| $23^{rd}$ surface | K = 0.0000 |
|  | A4 = 9.2146E−04 |
|  | A6 = 1.1444E−05 |
|  | A8 = −2.1929E−06 |
|  | A10 = 5.1818E−08 |
| $24^{th}$ surface | K = 0.0000 |
|  | A4 = −1.2146E−04 |
|  | A6 = 2.9540E−06 |
|  | A8 = −4.2768E−07 |
|  | A10 = 1.0786E−08 |

Various types of data
Zoom ratio 6.8

|  | (W) Wide-angle | (M) Middle | (T) Telephoto |
|---|---|---|---|
| Focal length | 4.743 | 13.414 | 32.255 |
| F-number | 3.500 | 3.805 | 5.500 |
| Half angle of view | 38.625 | 14.540 | 6.380 |
| Image height | 3.600 | 3.600 | 3.600 |
| Total length of lens | 73.500 | 73.500 | 73.500 |
| BF | 0.500 | 0.500 | 0.500 |
| d7 | 13.2561 | 4.4710 | 0.9229 |
| d12 | 0.6168 | 12.7093 | 21.0870 |
| d15 | 9.1370 | 5.8296 | 1.0000 |
| d23 | 0.7312 | 2.7585 | 7.8003 |
| d25 | 9.3310 | 7.3037 | 2.2619 |

Zoom lens group data

| Group | Forefront surface | Focal length |
|---|---|---|
| 1 | 1 | −12.653 |
| 2 | 8 | 14.523 |
| 3 | 13 | −9.114 |
| 4 | 16 | 12.768 |
| 5 | 24 | 14.374 |
| 6 | 26 | — |

TABLE 3

Example 3

Surface data

| Surface No. | r | d | nd | vd | θg, F |
|---|---|---|---|---|---|
| Object plane | ∞ | ∞ |  |  |  |
| 1 | 60.443 | 0.700 | 1.85135 | 40.1 |  |
| 2* | 11.737 | 4.000 |  |  |  |
| 3 | ∞ | 15.500 | 1.90366 | 31.3 |  |
| 4 | ∞ | 0.100 |  |  |  |
| 5 | 22.882 | 1.690 | 1.94595 | 18.0 | 0.6544 |
| 6 | 165.032 | 0.600 | 1.75520 | 27.5 |  |
| 7 | 16.990 | Variable |  |  |  |

TABLE 3-continued

Example 3

| | | | | | |
|---|---|---|---|---|---|
| 8 | 22.942 | 2.570 | 1.62299 | 58.1 | |
| 9 | -12.475 | 0.600 | 1.84666 | 23.8 | |
| 10 | -44.400 | 0.100 | | | |
| 11 | 22.982 | 1.620 | 1.72916 | 54.7 | |
| 12 | -54.967 | Variable | | | |
| 13 | -12.239 | 0.600 | 1.74330 | 49.2 | |
| 14 | 4.115 | 2.770 | 1.84666 | 23.8 | 0.6191 |
| 15 | 7.704 | Variable | | | |
| 16 (Diaphragm) | ∞ | 0.500 | | | |
| 17 | 5.227 | 5.000 | 1.49700 | 81.6 | |
| 18 | -5.774 | 0.400 | 1.80610 | 33.3 | |
| 19 | -22.621 | 0.100 | | | |
| 20 | 12.341 | 1.110 | 1.58913 | 61.2 | |
| 21* | -18.637 | Variable | | | |
| 22 | -12.577 | 0.400 | 1.69680 | 55.5 | |
| 23 | 15.069 | Variable | | | |
| 24* | -78.636 | 1.450 | 1.60700 | 27.1 | |
| 25* | -11.204 | 0.500 | | | |
| 26 | ∞ | 0.500 | 1.51680 | 64.2 | |
| 27 | ∞ | BF | | | |
| Image plane | ∞ | | | | |

Aspheric surface data

| | |
|---|---|
| 2nd surface | K = 0.0000 |
| | A4 = -5.3717E-05 |
| | A6 = -5.6183E-07 |
| | A8 = 4.0949E-09 |
| | A10 = -3.9349E-11 |
| 21st surface | K = 0.0000 |
| | A4 = 1.3083E-03 |
| | A6 = 4.7871E-05 |
| | A8 = -2.6660E-06 |
| | A10 = 3.7075E-07 |
| 24th surface | K = 0.0000 |
| | A4 = -7.3547E-03 |
| | A6 = 1.3810E-03 |
| | A8 = -8.3530E-05 |
| | A10 = 1.6501E-06 |
| 25th surface | K = 0.0000 |
| | A4 = -1.3377E-02 |
| | A6 = 2.4865E-03 |
| | A8 = -1.5059E-04 |
| | A10 = 3.0003E-06 |

Various types of data
Zoom ratio 6.8

| | (W) Wide-angle | (M) Middle | (T) Telephoto |
|---|---|---|---|
| Focal length | 4.743 | 13.414 | 32.255 |
| F-number | 3.500 | 4.445 | 5.661 |
| Half angle of view | 38.500 | 14.541 | 6.200 |
| Image height | 3.600 | 3.600 | 3.600 |
| Total length of lens | 70.000 | 70.000 | 70.000 |
| BF | 0.500 | 0.500 | 0.500 |
| d7 | 15.6040 | 6.9224 | 0.6458 |
| d12 | 0.5699 | 9.9838 | 17.8352 |
| d15 | 3.3071 | 2.5748 | 1.0000 |
| d21 | 7.9513 | 4.4818 | 0.9852 |
| d23 | 1.2577 | 4.7272 | 8.2238 |

Zoom lens group data

| Group | Forefront surface | Focal length |
|---|---|---|
| 1 | 1 | -15.460 |
| 2 | 8 | 14.236 |
| 3 | 13 | -6.533 |
| 4 | 16 | 7.555 |
| 5 | 22 | -9.780 |
| 6 | 24 | 21.352 |

TABLE 4

Example 4

Surface data

| Surface No. | r | d | nd | vd | θg, F |
|---|---|---|---|---|---|
| Object plane | ∞ | ∞ | | | |
| 1 | 70.982 | 0.700 | 1.85135 | 40.1 | |
| 2* | 11.768 | 3.900 | | | |
| 3 | ∞ | 15.400 | 1.90366 | 31.3 | |
| 4 | ∞ | 0.100 | | | |
| 5 | 23.326 | 2.130 | 1.92286 | 20.9 | 0.6388 |
| 6 | -117.343 | 0.600 | 1.71736 | 29.5 | |
| 7 | 16.150 | Variable | | | |
| 8 | 20.673 | 2.560 | 1.62299 | 58.1 | |
| 9 | -13.212 | 0.600 | 1.84666 | 23.8 | |
| 10 | -52.878 | 0.100 | | | |
| 11 | 22.525 | 1.560 | 1.72916 | 54.7 | |
| 12 | -67.109 | Variable | | | |
| 13 | -12.096 | 0.600 | 1.74330 | 49.2 | |
| 14 | 4.474 | 1.200 | 1.92286 | 20.9 | 0.6388 |
| 15 | 7.560 | Variable | | | |
| 16 (Diaphragm) | ∞ | 0.500 | | | |
| 17 | 4.847 | 6.000 | 1.49700 | 81.6 | |
| 18 | -4.516 | 0.400 | 1.81474 | 37.0 | |
| 19* | -24.761 | 0.100 | | | |
| 20 | 13.489 | 1.660 | 1.58913 | 61.2 | |
| 21 | -12.367 | Variable | | | |
| 22 | -12.497 | 0.400 | 1.71300 | 53.9 | |
| 23 | 14.547 | Variable | | | |
| 24* | -54.952 | 1.500 | 1.60700 | 27.1 | |
| 25* | -9.727 | 0.500 | | | |
| 26 | ∞ | 0.500 | 1.51680 | 64.2 | |
| 27 | ∞ | BF | | | |
| Image plane | ∞ | | | | |

Aspheric surface data

| | |
|---|---|
| 2nd surface | K = 0.0000 |
| | A4 = -6.0052E-05 |
| | A6 = -5.8498E-07 |
| | A8 = 4.9028E-09 |
| | A10 = -4.2864E-11 |
| 19th surface | K = 0.0000 |
| | A4 = 1.0793E-03 |
| | A6 = 5.4093E-05 |
| | A8 = -1.7859E-06 |
| | A10 = 3.5533E-07 |
| 24th surface | K = 0.0000 |
| | A4 = -5.9892E-03 |
| | A6 = 1.2134E-03 |
| | A8 = -7.4232E-05 |
| | A10 = 1.4475E-06 |
| 25th surface | K = 0.0000 |
| | A4 = -1.0626E-02 |
| | A6 = 2.1606E-03 |
| | A8 = -1.3377E-04 |
| | A10 = 2.6619E-06 |

TABLE 4-continued

Example 4

Various types of data
Zoom ratio 6.8

|  | (W) Wide-angle | (M) Middle | (T) Telephoto |
|---|---|---|---|
| Focal length | 4.743 | 13.414 | 32.255 |
| F-number | 3.500 | 4.436 | 5.705 |
| Half angle of view | 38.344 | 14.537 | 6.213 |
| Image height | 3.600 | 3.600 | 3.600 |
| Total length of lens | 70.000 | 70.000 | 70.000 |
| BF | 0.500 | 0.500 | 0.500 |
| d7 | 15.7224 | 7.0198 | 0.6203 |
| d12 | 0.5813 | 10.1911 | 18.2614 |
| d15 | 3.5781 | 2.6708 | 1.0000 |
| d21 | 7.3623 | 4.1109 | 0.8000 |
| d23 | 1.2460 | 4.4974 | 7.8083 |

Zoom lens group data

| Group | Forefront surface | Focal length |
|---|---|---|
| 1 | 1 | −15.429 |
| 2 | 8 | 14.396 |
| 3 | 13 | −6.818 |
| 4 | 16 | 7.897 |
| 5 | 22 | −9.370 |
| 6 | 24 | 19.230 |

TABLE 5

Example 5

Surface data

| Surface No. | r | d | nd | νd | θg, F |
|---|---|---|---|---|---|
| Object plane | ∞ | ∞ | | | |
| 1 | −7449.149 | 0.700 | 1.81474 | 37.0 | |
| 2* | 11.474 | 2.890 | | | |
| 3 | ∞ | 13.950 | 1.90366 | 31.3 | |
| 4 | ∞ | 0.100 | | | |
| 5 | 20.568 | 1.230 | 1.92286 | 20.9 | 0.6388 |
| 6 | 44.480 | 0.600 | 1.69700 | 48.5 | |
| 7 | 15.893 | Variable | | | |
| 8 | 64.918 | 0.600 | 1.84666 | 23.8 | |
| 9 | 14.063 | 2.520 | 1.72916 | 54.7 | |
| 10 | −47.981 | 0.100 | | | |
| 11 | 16.575 | 2.090 | 1.72916 | 54.7 | |
| 12 | −122.416 | Variable | | | |
| 13 | −17.657 | 0.600 | 1.83481 | 42.7 | |
| 14 | 5.449 | 1.000 | 1.92286 | 20.9 | 0.6388 |
| 15 | 11.512 | Variable | | | |
| 16 (Diaphragm) | ∞ | 0.500 | | | |
| 17 | 6.850 | 1.900 | 1.65844 | 50.8 | |
| 18 | 166.553 | 2.600 | | | |
| 19 | 17.304 | 2.150 | 1.49700 | 81.6 | |
| 20 | −6.595 | 0.600 | 1.80486 | 24.7 | |
| 21* | −16.486 | 1.050 | | | |
| 22 | −10.589 | 0.700 | 1.90366 | 31.3 | |
| 23 | 45.686 | Variable | | | |
| 24* | 55.258 | 2.140 | 1.53048 | 55.7 | |
| 25 | −9.812 | Variable | | | |

TABLE 5-continued

Example 5

| 26 | ∞ | 0.500 | 1.51680 | 64.2 |
|---|---|---|---|---|
| 27 | ∞ | BF | | |
| Image plane | ∞ | | | |

Aspheric surface data

| $2^{nd}$ surface | K = 0.0000 |
| | A4 = −1.0539E−04 |
| | A6 = −8.5696E−07 |
| | A8 = 6.5791E−09 |
| | A10 = −6.0994E−11 |
| $21^{st}$ surface | K = 0.0000 |
| | A4 = 9.7219E−04 |
| | A6 = 1.6120E−05 |
| | A8 = 4.4945E−07 |
| | A10 = 6.3150E−08 |
| $24^{th}$ surface | K = 0.0000 |
| | A4 = 1.3588E−04 |
| | A6 = −1.1496E−05 |
| | A8 = 5.2546E−07 |
| | A10 = −1.1494E−08 |

Various types of data
Zoom ratio 6.80002

|  | (W) wide-angle | (M) middle | (T) telephoto |
|---|---|---|---|
| Focal length | 4.743 | 13.414 | 32.255 |
| F-number | 3.500 | 3.801 | 5.500 |
| Half angle of view | 38.635 | 14.541 | 6.379 |
| Image height | 3.600 | 3.600 | 3.600 |
| Total length of lens | 73.493 | 73.493 | 73.493 |
| BF | 0.500 | 0.500 | 0.500 |
| d7 | 13.5791 | 4.5571 | 1.3300 |
| d12 | 0.5649 | 12.7541 | 20.7767 |
| d15 | 8.9628 | 5.7956 | 1.0000 |
| d23 | 0.7341 | 2.6617 | 8.8286 |
| d25 | 10.6326 | 8.7051 | 2.5382 |

Zoom lens group data

| Group | Forefront surface | Focal length |
|---|---|---|
| 1 | 1 | −12.821 |
| 2 | 8 | 14.580 |
| 3 | 13 | −8.806 |
| 4 | 16 | 13.275 |
| 5 | 24 | 15.888 |
| 6 | 26 | — |

TABLE 6

| | Value of conditional expression | Example 1 | Example 2 | Example 3 | Example 4 | Example 5 |
|---|---|---|---|---|---|---|
| (1) | |f1|/fw | 2.49 | 2.67 | 3.26 | 3.25 | 2.70 |
| (2) | |fL1|/fw | 2.70 | 2.93 | 3.63 | 2.51 | 2.96 |
| (3) | vd1p | 23.8 | 20.9 | 18.0 | 20.9 | 20.9 |
| (4) | θg, F1p + 0.001767 × vd1p − 0.6477 | 0.0135 | 0.0280 | 0.0385 | 0.0280 | 0.028 |
| (5) | vd3p | 18.0 | 20.9 | 23.8 | 20.9 | 20.9 |
| (6) | θg, F3p + 0.001767 × vd3p − 0.6477 | 0.0385 | 0.0280 | 0.0135 | 0.0280 | 0.028 |
| (7) | f2/|f1| | 1.18 | 1.15 | 0.92 | 0.93 | 1.14 |
| (8) | (β2t/β2w)/(ft/fw) | 0.334 | 0.325 | 0.303 | 0.305 | 0.315 |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom lens comprising, in order from an object side thereof: a first lens group having a negative optical power and comprising a reflection optical element for bending an optical path by almost 90 degrees; a second lens group having a positive optical power; a third lens group having a negative optical power; a fourth lens group having a positive optical power; and, a fifth lens group, wherein the first lens group and the fourth lens group are positioned at a fixed distance in a direction of the optical axis from an image plane of the zoom lens for varying a power of the zoom lens from a wide-angle end to a telephoto end, at least the second lens group, the third lens group and the fifth lens group move along an optical axis thereof for varying a power of the zoom lens from a wide-angle end to a telephoto end so as to reduce a distance between the first lens group and the second lens group and to reduce a distance between the third lens group and the fourth lens group and to change a distance between the fourth lens group and the fifth lens group, and the zoom lens satisfies a following expression: $1.0 < |f1|/fw < 6.0$, where f1 is a focal length of the first lens group, and fw is a focal length of the zoom lens at the wide-angle end.

2. The zoom lens of claim 1, wherein the zoom lens satisfies a following expression:

$1.5 < |f1|/fw < 4.0$.

3. The zoom lens of claim 1, wherein the first lens group further comprises a negative lens arranged on the object side of the reflection optical element and comprising an object-side surface and an image-side surface which is a concave surface having a larger curvature than the object-side surface, and the negative lens of the first lens group satisfies a following expression:

$1.5 < |fL1|/fw < 5.0$, where fL1 is a focal length of the negative lens in the first lens group.

4. The zoom lens of claim 3, wherein the zoom lens satisfies a following expression:

$2.0 < |fL1|/fw < 4.0$.

5. The zoom lens of claim 1, wherein the first lens group further comprises: a negative lens arranged on the object side of the reflection optical element and comprising an object-side surface and an image-side surface which is a concave surface having a larger curvature than the object-side surface, and a single or a plurality of positive lens arranged on an image side of the reflection optical element, and the single or the plurality of positive lens satisfies the following expressions: vd1p <26.0, and θg,F1 p +0.001767 ×vd1p −0.6477 >0.01, where vd1p is an average of an Abbe number of the single or the plurality of positive lens in the first lens group, and θg,F1 p is an average of a partial deviation ratio of the single or the plurality of positive lens in the first lens group, and is defined as θg,F1 p =(ng−nF)/(nF−nC), where ng, nF, nC are refractive indexes of the single or the plurality of positive lens for g line, F line, and C line, respectively.

6. The zoom lens of claim 1, wherein the fourth lens moves in a perpendicular direction to an optical axis of the fourth lens to stabilize an image formed on the image plane.

7. The zoom lens of claim 1, wherein the fourth lens comprises a partial lens group including a lens closest to an image side in the fourth lens group, and the partial lens group moves in a perpendicular direction to the optical axis of the partial lens group to stabilize an image formed on the image plane.

8. The zoom lens of claim 1, wherein the third lens group comprises a single or a plurality of positive lens, and the single or the plurality of positive lens satisfies following expressions:

vd3p<26.0, and

θg,F3p+0.001767×vd3p−0.6477>0.01, where vd3p is an average of an Abbe number of the single or the plurality of positive lens in the third lens group, and θg,F3p is an average of a partial deviation ratio of the single or the plurality of positive lens in the third lens group, and is defined as θg,F3p=(ng−nF)/(nF−nC), where ng, nF, nC are refractive indexes of the single or the plurality of positive lens for g line, F line, and C line, respectively.

9. The zoom lens of claim 1, wherein the zoom lens satisfies following expressions:

$0.6 < f2/|f1| < 2.0$, and $0.2 < (β2t/β2w)/(ft/fw) < 0.5$, where f2 is a focal length of the second lens group,
β2w is a paraxial lateral magnification of the second lens group at the wide-angle end,
β2t is a paraxial magnification of the second lens group at the telephoto end, and
ft is a focal length of the zoom lens at the telephoto end.

10. The zoom lens of claim 9,
wherein the zoom lens satisfies following expressions:

$$0.8 \leq f2/|f1| < 1.5, \text{ and}$$

$$0.25 < (\beta 2t/\beta 2w)/(ft/fw) < 0.4.$$

11. The zoom lens of claim 1, further comprises a diaphragm arranged on the object side of the fourth lens group.

12. An image pickup apparatus comprising:
an image pickup element comprising a light-receiving surface for converting an optical image formed on the light-receiving surface into electric signal; and
the zoom lens of claim 1 for forming an optical image of a subject on the light-receiving surface of the image pickup element.

13. The image pickup apparatus of claim 12, further comprising a mechanical shutter arranged on the object side next to the fourth lens group, and
the mechanical shutter is positioned at a fixed distance from the image plane for varying a power of the zoom lens.

14. A digital equipment comprising:
the image pickup apparatus of claim 12, and
a controller for controlling the image pickup apparatus to shoot a still image or a video of the subject.

* * * * *